(12) United States Patent
Lango et al.

(10) Patent No.: US 7,478,164 B1
(45) Date of Patent: Jan. 13, 2009

(54) METHODS AND APPARATUS FOR PACING DELIVERY OF STREAMING MEDIA DATA

(75) Inventors: Jason Lango, Mountain View, CA (US); Konstantinos Roussos, Sunnyvale, CA (US); Robert Lieh-Yuan Tsai, Atlanta, GA (US); J. Christopher Wagner, Langley, WA (US)

(73) Assignee: NetApp, Inc., Sunnyvale, CA (US)

( * ) Notice: Subject to any disclaimer, the term of this patent is extended or adjusted under 35 U.S.C. 154(b) by 619 days.

(21) Appl. No.: 09/981,644

(22) Filed: Oct. 16, 2001

Related U.S. Application Data

(60) Provisional application No. 60/297,943, filed on Jun. 12, 2001.

(51) Int. Cl.
*G06F 15/16* (2006.01)
*H04N 7/173* (2006.01)
(52) U.S. Cl. .............................. 709/231; 725/92; 725/94
(58) Field of Classification Search ................. 709/217, 709/226, 203, 231, 233, 213–216; 711/118, 711/111; 725/134, 142, 91–96, 114–117
See application file for complete search history.

(56) References Cited

U.S. PATENT DOCUMENTS

| | | | |
|---|---|---|---|
| 5,043,885 A | | 8/1991 | Robinson |
| 5,402,416 A | | 3/1995 | Cieslak et al. |
| 5,583,561 A | | 12/1996 | Baker et al. |
| 5,586,264 A | | 12/1996 | Belknap et al. |
| 5,615,362 A | | 3/1997 | Jensen et al. |
| 5,737,747 A | | 4/1998 | Vishlitzky et al. |
| 5,799,185 A | | 8/1998 | Watanabe |
| 5,819,292 A | | 10/1998 | Hitz et al. |
| 5,854,887 A | * | 12/1998 | Kindell et al. ................. 725/86 |
| 5,918,020 A | * | 6/1999 | Blackard et al. ............. 709/228 |
| 5,960,452 A | | 9/1999 | Chi |
| 5,963,962 A | | 10/1999 | Hitz et al. |
| 6,038,230 A | | 3/2000 | Ofek |
| 6,038,570 A | | 3/2000 | Hitz et al. |
| 6,064,676 A | | 5/2000 | Slattery et al. |
| 6,085,193 A | | 7/2000 | Malkin et al. |
| 6,111,896 A | | 8/2000 | Slattery et al. |

(Continued)

OTHER PUBLICATIONS

NetCache™ 5.1 Web Cache First-Time Configuration Guide, Network Appliance, Inc., Sunnyvale, California, Apr. 2001.

(Continued)

*Primary Examiner*—Andrew Caldwell
*Assistant Examiner*—Benjamin Ailes
(74) *Attorney, Agent, or Firm*—Perkins Coie LLP

(57) ABSTRACT

A computer system having a memory for providing streaming media in one of a plurality of streaming media protocols includes a first plurality of interfaces configured to initiate reading of packet meta-data and packets of payload data from a memory, and a second plurality of interfaces configured to output streaming media packets to a client system at a requested pace, wherein the streaming media packets are determined in response to the packet meta-data, to the packets of payload data, and to a streaming media protocol requested, wherein the packet meta-data and the packets of payload data are read from the memory at a pace independent of the requested pace for the streaming media packets, and wherein the second plurality of interfaces support more than one streaming media protocol.

18 Claims, 13 Drawing Sheets

U.S. PATENT DOCUMENTS

| | | | |
|---|---|---|---|
| 6,275,496 | B1 | 8/2001 | Burns et al. |
| 6,324,182 | B1 | 11/2001 | Burns et al. |
| 6,343,083 | B1 | 1/2002 | Mendelson et al. |
| 6,351,471 | B1 | 2/2002 | Robinett et al. |
| 6,351,474 | B1 | 2/2002 | Robinett et al. |
| 6,366,970 | B1 * | 4/2002 | Wolff et al. .................... 710/52 |
| 6,370,688 | B1 | 4/2002 | Hejna, Jr. |
| 6,377,972 | B1 * | 4/2002 | Guo et al. .................... 709/201 |
| 6,407,680 | B1 | 6/2002 | Lai et al. |
| 6,463,508 | B1 | 10/2002 | Wolf et al. |
| 6,484,212 | B1 | 11/2002 | Markowitz et al. |
| 6,505,169 | B1 | 1/2003 | Bhagavath et al. |
| 6,516,361 | B2 | 2/2003 | Lym et al. |
| 6,522,649 | B1 | 2/2003 | Stallkamp |
| 6,593,860 | B2 | 7/2003 | Lai et al. |
| 6,594,699 | B1 * | 7/2003 | Sahai et al. .................... 709/228 |
| 6,594,751 | B1 | 7/2003 | Leivent |
| 6,651,103 | B1 * | 11/2003 | Markowitz et al. .......... 709/231 |
| 6,665,755 | B2 | 12/2003 | Modelski et al. |
| 6,708,213 | B1 * | 3/2004 | Bommaiah et al. .......... 709/226 |
| 6,721,850 | B2 | 4/2004 | Hofmann et al. |
| 6,742,082 | B1 | 5/2004 | Lango et al. |
| 6,744,763 | B1 * | 6/2004 | Jones et al. .................... 370/394 |
| 6,747,991 | B1 | 6/2004 | Hemy et al. |
| 6,760,765 | B1 | 7/2004 | Asai et al. |
| 6,829,648 | B1 * | 12/2004 | Jones et al. .................... 709/230 |
| 6,917,984 | B1 | 7/2005 | Tan |
| 6,990,512 | B1 | 1/2006 | Major et al. |
| 7,191,242 | B1 | 3/2007 | Serenyi et al. |
| 7,356,575 | B1 | 4/2008 | Shapiro |
| 2001/0003193 | A1 * | 6/2001 | Woodring et al. ........... 709/310 |
| 2001/0034786 | A1 * | 10/2001 | Baumeister et al. .......... 709/231 |
| 2001/0052132 | A1 | 12/2001 | Fryer |
| 2002/0029282 | A1 | 3/2002 | Buddhikot et al. |
| 2002/0042837 | A1 | 4/2002 | Ebata et al. |
| 2002/0047899 | A1 * | 4/2002 | Son et al. .................... 348/114 |
| 2002/0056126 | A1 | 5/2002 | Srikantan et al. |
| 2002/0097750 | A1 | 7/2002 | Gunaseelan et al. |
| 2002/0116473 | A1 | 8/2002 | Gemmell |
| 2002/0116585 | A1 | 8/2002 | Scherr |
| 2002/0162047 | A1 | 10/2002 | Peters et al. |
| 2002/0169926 | A1 * | 11/2002 | Pinckney et al. ............ 711/118 |
| 2002/0181506 | A1 * | 12/2002 | Loguinov .................... 370/473 |
| 2003/0005452 | A1 | 1/2003 | Rodriguez |
| 2003/0067877 | A1 | 4/2003 | Sivakumar et al. |
| 2003/0189936 | A1 | 10/2003 | Terrell et al. |
| 2003/0217113 | A1 | 11/2003 | Katz et al. |
| 2003/0236904 | A1 | 12/2003 | Walpole et al. |
| 2004/0039837 | A1 | 2/2004 | Gupta et al. |
| 2004/0162787 | A1 | 8/2004 | Madison et al. |
| 2004/0163123 | A1 | 8/2004 | Okada et al. |
| 2004/0202148 | A1 | 10/2004 | Kuehnel |
| 2005/0117580 | A1 | 6/2005 | del Val et al. |
| 2005/0223107 | A1 | 10/2005 | Mine et al. |
| 2006/0047774 | A1 | 3/2006 | Bowman et al. |
| 2006/0064500 | A1 | 3/2006 | Roth et al. |
| 2006/0106961 | A1 | 5/2006 | Ebata et al. |
| 2006/0184667 | A1 | 8/2006 | Clubb et al. |
| 2006/0218611 | A1 | 9/2006 | Son et al. |
| 2007/0094407 | A1 | 4/2007 | Serenyi et al. |
| 2007/0143468 | A1 | 6/2007 | Serenyi et al. |
| 2008/0095339 | A1 | 4/2008 | Elliott et al. |

OTHER PUBLICATIONS

NetCache™ 5.1 Routine Administration Guide, Network Appliance, Inc., Sunnyvale, California, Apr. 2001.

NetCache™ 5.1 Configuration Guide, Network Appliance, Inc., Sunnyvale, California, Apr. 2001.

NetCache™ 5.1 Deployment Planning Guide, Network Appliance, Inc., Sunnyvale, California, Apr. 2001.

NetCache™ 5.1 Features and Configuration Planning Guide, Network Applicance, Inc., Sunnyvale, California, Apr. 2001.

NetCache™ 5.1 Streaming Media Cache First-Time Configuration Guide, Network Appliance, Inc., Sunnyvale, California, Apr. 2001.

NetCache™ 5.1 Accelerator First-Time Configuration Guide, Network Appliance, Inc., Sunnyvale, California, Apr. 2001.

H. Schulzrinne et al., "Real Time Streaming Protocol (RTSP)", Apr. 1998, pp. 1-86, The Internet Society.

* cited by examiner

DATA FORMAT HIERARCHY

METHODS AND APPARATUS FOR PACING DELIVERY OF STREAMING MEDIA DATA

CROSS-REFERENCE TO RELATED APPLICATIONS

The present invention disclosure claims priority to Provisional U.S. Patent Application No. 60/297,943, filed Jun. 12, 2001, entitled Streaming Media Payload Storage Method and Apparatus. This application is herein by incorporated by reference for all purposes.

BACKGROUND OF THE INVENTION

The present invention relates to data caching. More particularly, the present invention relates to apparatus for caching streaming media and to methods of operation of streaming media caches.

Typical file caching methods include a cache receiving a file from a file server, and storing the entire file. Later, when a client desires the file, instead of serving the file from the file server, the file is served from the cache. Because the cache is typically a server that is closer to the client or has higher bandwidth than the file server, the file is served to the client quickly from the cache.

It has been discovered by the inventors, that attempting to apply typical file caching methods to files that include streaming media data, raises many new problems. For instance, serving a streaming media data file from a cache requires much more processing by the cache than with classical file transfers over the web. For example, during normal playback, the cache may need to perform a lot of processing such as packet modification, resequencing, and retiming. As another example, the cache may be called upon to perform random access within the streaming media data file as a result of a client "rewind" or "fast forward" operation. Because, classical caching is typically file-based, such a random access would involve moving within a very large data file.

Another drawback is that since streaming media data files are very large, a huge penalty is incurred if the streaming media data file is deleted. Typically if a file cache determines that it needs more disk space for new files, it will first delete older files, regardless of the size. As an example, if an older file is a streaming media data file that stores an hour-long program, the entire hour-long program is deleted even if the cache only needs to free up the equivalent of 1 minute of space.

Another drawback is that many different streaming media formats exist, each with its own specific streaming requirements. This is in contrast to classical file transfer over the web, where the files are essentially opaque to the cache and for streaming data to clients, the cache does not need to process the actual contents of the file beyond storage and retrieval.

Thus what is required are improved methods and apparatus for storing and serving streaming media within a cache. Further, what is required are methods and apparatus for providing such solutions in economical ways.

BRIEF SUMMARY OF THE INVENTION

The present invention relates to streaming media caches and methods of operation. More particularly, the present invention relates to efficient retrieval of streaming media data by receiving streaming media data, then storing the data in a format that can be efficiently streamed to client systems.

In the present disclosure "Streaming media" data generally refers to media intended to be transported at a select (often, subscribed) bit rate, and with a desired timeliness. The streaming media is adapted for playback in a desired order without regard to the order the streaming media data are received by a client system. Streaming media generally conforms to a real-time delivery protocol, such as, e.g., RTSP, RTP, or the like. The media (media clip) represented in the streaming media data may include static images, video data, audio data, executable files, presentation data, applet data, data files, and the like.

The data that is cached in a streaming media cache may be an entire streaming media clip, portions of a streaming media clip, or the like. In the case where there is a streaming media cache hit, the portion of the streaming media stored in the streaming media cache is served to a client. In the case of a streaming media cache miss, the missing portion of a streaming media clip may be retrieved from a media server, instead of an entire streaming media clip. The missing portion of the streaming media clip that is retrieved from an upstream or origin server is then stored and then served to a client. Storing a streaming media clip in the efficient method described below allows the streaming media cache to maintain portions of a streaming media clip that are often requested, and to flush portions of the streaming media clip that are not often requested.

According to one aspect of the invention, a computer system having a memory for providing streaming media in one of a plurality of streaming media protocols is described. One such system may include a first plurality of interfaces configured to initiate reading of packet meta-data and packets of payload data from a memory, and a second plurality of interfaces configured to output streaming media packets to a client system at a requested pace, wherein the streaming media packets are determined in response to the packet meta-data, to the packets of payload data, and to a streaming media protocol requested. In embodiments, the packet meta-data and the packets of payload data are read from the memory at a pace independent of the requested pace for the streaming media packets. Further, in other embodiments, the second plurality of interfaces support more than one streaming media protocol.

According to another aspect of the invention, a streaming media cache including processes is disclosed. One such cache includes a first process thread configured to initiate reading of data chunks from a memory, and configured to indicate when data chunks have been read from the memory, the data chunks including packet payloads and packet meta-data, and a second process thread configured to initiate reading of a first data object meta-data from the memory, configured to determine if object meta-data for a second data object is stored in the memory, configured to initiate retrieving data from an upstream server for storage as the second data object when the second data object is not stored in the memory, and configured to indicate when the second data object has been retrieved, wherein data objects comprise a plurality of data chunks. Other caches may include a third process thread configured to output streaming media packets to a client via a network, the streaming media packets determined in response to packet payloads and packet meta-data. The third process thread outputs streaming media packets may include packet payloads from a first data chunk while the second data chunk is read from the memory.

According to yet aspect of the invention, a method of outputting streaming media data in a streaming media format from a streaming media cache is disclosed. The technique may include retrieving a first data object from a disk memory, the first data object including a first plurality of packet payloads, and thereafter sending a first stream of media packets to a client at specified packet delivery times, wherein the media packets from the first stream of media packets comprises packet payloads from the first plurality of packet payloads. In other schemes, the technique may also include the step of retrieving a second data object from the disk memory, the second data object including a second plurality of packet payloads. Sending of the first stream of media packets to the client and retrieving the second data object from the disk memory may occur in parallel.

According to yet another aspect of the invention, a multi-protocol streaming apparatus coupled to a client system is described. One such apparatus may include a first portion configured to initiate retrieval of a first plurality of media data from a disk memory and to initiate retrieval of a second plurality of media data from the disk memory, and a second portion coupled to the first portion configured to output a first media data stream in a requested streaming media protocol at a specified streaming rate to a client system, wherein the first media data stream is determined in response to the first plurality of media data. In such apparatus, the first portion initiates retrieval of the second plurality of media data while the second portion outputs the first media data stream to the client system.

DETAILED DESCRIPTION OF THE INVENTION

Figure 1A:
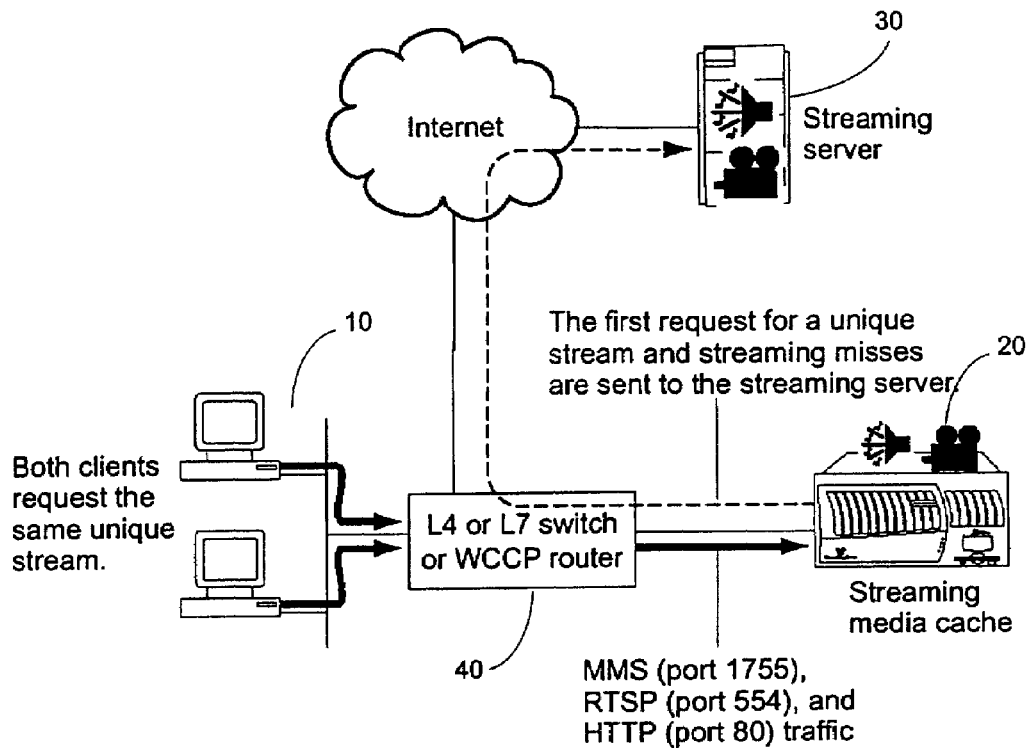
FIGS. 1A-B illustrate overview diagrams according to embodiments of the present invention.

FIG. 1A illustrates a overview diagram according to an embodiment of the present invention. In particular, FIG. 1A includes a client system 10, a streaming media cache (server) 20, media data server 30 (streaming server), and a router 40. The elements of FIG. 1A are coupled as disclosed over computer networks such as a local area network, wide area networks (Internet), wireless networks or the like.

In one embodiment, client system 10 initially makes a request for a stream of streaming media. The media (media clip) may include static images, video data, audio data, executable files, and the like. This request may take the form of a user clicking upon a URL on a web page, or the like. In this embodiment, this request is intercepted by router 40. Router 40 may be embodied as a layer 4 or layer 7 switch, a Web Cache Coordination Protocol (WCCP) router, or any other conventional switch or router. In such embodiments, router 40 would be configured to recognize when a request is made by client system 10 for a stream of streaming media.

If such a request is determined by router 40, that request is redirected to streaming media cache 20, and not media data server 30. Once streaming media cache 20 receives the request, it makes a determination whether the stream (the entire media clip) or the requested portion of the stream (the request portion of the media clip) has already been cached. If the data has been previously stored, streaming media cache 20 provides the streaming media to client system 10.

In the present embodiment, if the data (requested portion of a stream) has not previously been stored in streaming media cache 20, streaming media cache 20 sends a request to media server 30 for a stream of data including the requested portion of a stream. As the requested portion of the stream of data are delivered to streaming media cache 20, it is forwarded to client system 10, and the portion of the stream of data are stored.

For this embodiment, the streaming media traffic is received by media cache 20 from specific ports. In specific embodiments, for RealNetworks RealSystem streaming media, media cache 20 receives streaming media via TCP on port 554; for QuickTime (RTSP) streaming media, media cache 20 receives streaming media via TCP on port 554 and/or via UDP on port 2001; for Microsoft Media Streaming (MMS) streaming media, media cache 20 receives streaming media data via TCP on port 1755; and for HTTP streaming media, media cache 20 receives streaming media data via TCP on port 80, or the like. In other embodiments, other ports for the streaming media may also be used.

Figure 1B:
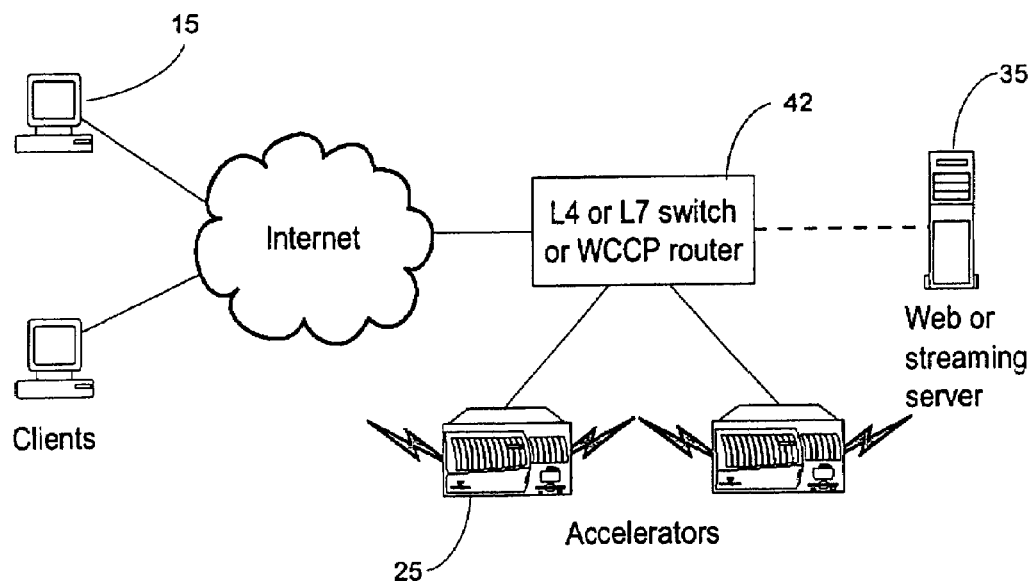

The embodiment illustrated above is configured to be accessible from client system 10 via a local area network. It should be understood that streaming media cache 20 may be alternatively positioned at other points in the network, for example, at the edge of a point of presence network on the Internet, and the like. An example is illustrated in FIG. 1B FIG. 1B illustrates a overview diagram according to another embodiment of the present invention. In particular, FIG. 1B includes a client system 15, a streaming media cache (server) 25, media data server 35 (streaming server), and a router 42. The elements of FIG. 1B are coupled as disclosed over computer networks such as a local area network, wide area networks (Internet), wireless networks or the like. In this embodiment, streaming media cache 25 may be embodied as an accelerator on the edge of a point of presence (POP).

In this embodiment, client system 15 initially makes a request for a stream of streaming media (representing a streaming media clip). This request may take the form of a user clicking upon a URL on a web page, or the like. In this embodiment, the request is passed over the wide area network and is intercepted by router 42. Router 42 may be embodied as a layer 4 or layer 7 switch, a WCCP router, or any other conventional switch or router. In this embodiments, router 42 would be configured to recognize when a request is made by client system 10 for a stream of streaming media.

If such a request is determined by router 42, that request is redirected to streaming media cache 25, and not media data server 35. Once streaming media cache 25 receives the request, it makes a determination whether the streaming media clip or the requested portion of the streaming media clip has already been cached. If the data has been previously stored, streaming media cache 25 provides the streaming media to client system 10.

In the present embodiment, if the data has is not stored in streaming media cache 25, streaming media cache 25 sends a request to media server 35 for the missing data. As the stream of data (including the portion of the streaming media clip) is delivered to streaming media cache 25, it is forwarded to client system 15. The missing portion of the streaming media clip is then stored in streaming media cache 25. Details of the storage format and the process of storing and retrieving the stream of data are described in greater detail below.

For this embodiment, the streaming media traffic is sent by media cache 20 to specific ports. In specific embodiments, for RealSystem streaming media, media cache 20 sends streaming media via TCP on port 554; for QuickTime (RTSP) streaming media, media cache 20 sends streaming media via TCP on port 554 and/or via UDP on port 2001; for Microsoft Media Streaming (MMS) streaming media, media cache 20 sends streaming media data via TCP on port 1755; and for HTTP streaming media, media cache 20 sends streaming media data via TCP on port 80, or the like. In other embodiments, other ports for the streaming media may also be used.

In other embodiments of the present invention, one or more streaming media caches may be positioned simultaneously at the illustrated locations between client system 15 and media server 35. Additional streaming media caches may also be positioned at other locations between client system 15 and media server 35, for example at a user ISP, on an intranet, and the like. In light of this disclosure, it will be apparent that many other network configurations can incorporate embodiments of the present invention.

Figure 2:
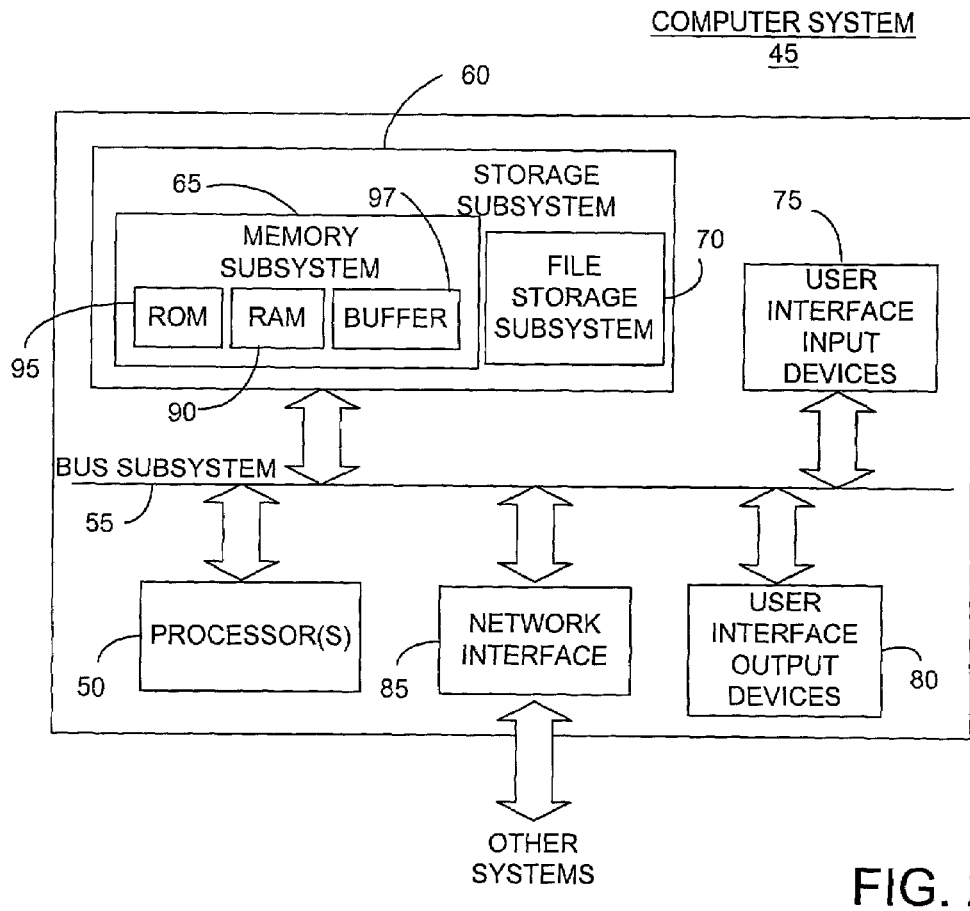
FIG. 2 is a simplified block diagram of a computer system according to an embodiment of the present invention.

FIG. 2 is a simplified block diagram of a computer system 45 according to an embodiment of the present invention. Computer system 45 may be used as client system 10, streaming media cache 20, and/or media data server system 30. Computer system 45 may be a stand-alone computer system, a computer "appliance," or the like.

As shown in FIG. 2, computer system 45 includes at least one processor 50, which communicates with a number of peripheral devices via a bus subsystem 55. These peripheral devices may include a storage subsystem 60, comprising a memory subsystem 65 and a file storage subsystem 70 user interface input devices 75, user interface output devices 80, and a network interface subsystem 85. The input and output devices allow user interaction with computer system 45. A user may be a human user, a device, a process, another computer, and the like.

Network interface subsystem 85 provides an interface to other computer systems. Embodiments of network interface subsystem 85 include an Ethernet card, a modem (telephone, satellite, cable, ISDN), (asynchronous) digital subscriber line (DSL) units, and the like. Network interface 250 is coupled to a typical network as shown.

User interface input devices 75 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 50.

User interface output devices 80 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 45.

Storage subsystem 60 may be configured to store the basic programming and data constructs that provide the functionality of the computer system and of the present invention. For example, according to an embodiment of the present invention, software modules implementing the functionality of the present invention may be stored in storage subsystem 60. These software modules may be executed by processor(s) 50 of computer system 45. In a distributed environment, the software modules may be stored on a plurality of computer systems and executed by processors of the plurality of computer systems. Storage subsystem 60 may also provide a repository for storing various databases that may be used to store information according to the teachings of the present invention. For example, a cache entry hash table, discussed below, may be stored in storage subsystem 60 of media server 30. Storage subsystem may also function as a cache of streaming media cache 20. Storage subsystem 60 may comprise memory subsystem 65 and file storage subsystem 70.

Memory subsystem 65 may include a number of memories including a main random access memory (RAM) 90 for storage of instructions and data during program execution and a read only memory (ROM) 95 in which fixed instructions are stored. RAM 90 is typically also used for execution of programs, storage of data, and the like.

File storage subsystem 70 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

A memory buffer 97 is also provided in storage subsystem 60. In this embodiment, memory buffer 97 is a special buffer memory coupled to file storage subsystem 70. More specifically, memory buffer 97 provides a temporary storage area for data retrieved from and data sent to file storage subsystem 70. Memory buffer 97 may also provide a temporary storage area for data received from a streaming media server (or other upstream server) and for data to be sent to client systems. As will be discussed below, the type of data may include streaming media payload data.

In the present embodiment, computer system 45 typically also includes software that enables it to send and receive data and communications to and from client systems 10 and media data server 30 using communications protocols including, HTTP, S-HTTP, TCP/IP, UDP, SSL, RTP/RTSP and the like. In alternative embodiments of the present invention, other software and transfer and communication protocols may also be used, for example IPX, UDP or the like.

Bus subsystem 55 provides a mechanism for letting the various components and subsystems of computer system 45 communicate with each other as intended. The various subsystems and components of computer system 45 need not be at the same physical location but may be distributed at various locations within a network. Although bus subsystem 55 is shown schematically as a single bus, alternative embodiments of the bus subsystem may utilize multiple busses.

Computer system 45 itself can be of varying types including a personal computer, a portable computer, a workstation, a computer terminal, a network computer, a mainframe, a kiosk, a personal digital assistant (PDA), a wireless communication device such as a cell phone, an entertainment console (PS2, X-box) or any other data processing system. Due to the ever-changing nature of computers and networks, the description of computer system 45 depicted in FIG. 1B is intended only as a specific example for purposes of illustrating an embodiment of the computer system.

In one embodiment, computer system 45 is embodied as a network cache (appliance) in a product called "NetCache" available from NetworkAppliance, Incorporated. The NetCache family of products currently includes the NetCache C1100, NetCache C3100, and NetCache C6100 including proprietary, but available hardware and software. Embodiments of the present invention may also be implemented in future additions to the NetCache family of products.

It will be readily apparent to one of ordinary skill in the art that many other hardware and software configurations are suitable for use with the present invention. For example, other types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. and the like. Further, other types of operating systems are contemplated in alternative embodiments including WindowsNT™ from Microsoft, Solaris from Sun Microsystems, LINUX, UNIX, MAC OS X from Apple Computer Corporation, BeOS™, and the like. Many other configurations of a computer system are possible having more or fewer components than the computer system depicted in FIG. 1B.

Figure 3:
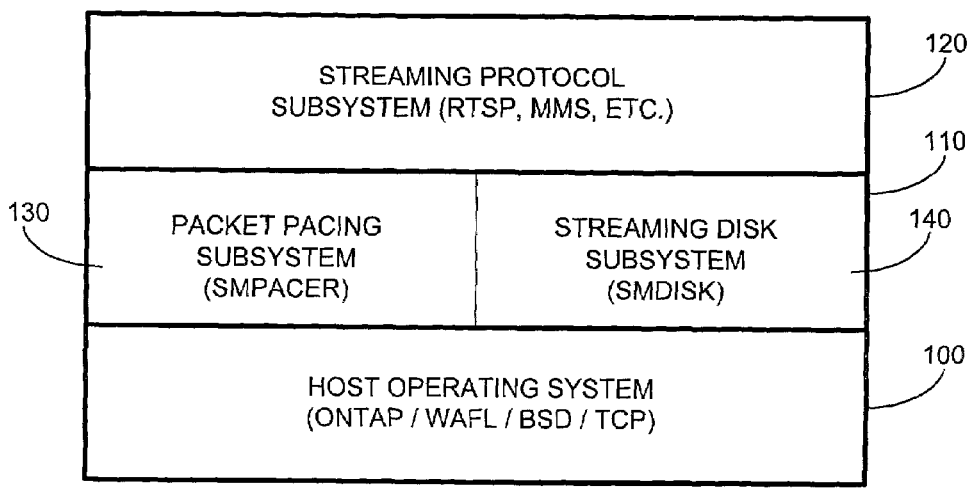
FIG. 3 illustrates a software hierarchy according to embodiments of the present invention.

FIG. 3 illustrates a software hierarchy according to embodiments of the present invention. In particular, FIG. 3 includes a three-tiered hierarchy including an operating system level (layer) 100, a data handling level (layer) 110, and a protocol level (layer) 120.

In the present embodiment, as illustrated, operating system level (layer) 100 includes portions of the Berkeley Software Distribution (BSD) operating system. Additionally, operating system level 100 includes software provided by the assignee of the present invention: Data ONTAP™, a Network Appliance brand operating system with Write Anywhere File Layout (WAFL™), a Network Appliance brand file system. In the present embodiment, the Data ONTAP™ operating system provides efficient file service by using file-system technology and a microkernel design geared towards network data access. The WAFL™ file system provides efficient file storage and retrieval based upon efficient access algorithms and data structures. Additionally, network communications using Transmission Control Protocol (TCP) and UDP are also supported at operating system level 100. Of course other types of operating systems can also be used.

As illustrated in FIG. 3, data handling level (layer) 110 includes a packet pacing subsystem (SMPACER) 130 and a streaming disk subsystem (SMDISK) 140. In the present embodiment, streaming disk subsystem 140 is used to retrieve data packets from the file system and to provide the data to SMPACER 130. As will be described below, in one embodiment, SMDISK 140 receives streaming media data packets and in turn SMDISK 140 creates a series of specialized data objects for storing the data. Further, SMDISK 140 receives the specialized data objects from the file system and stores the data packets into a buffer for output as streaming media.

In this embodiment, SMPACER 130 receives data packets (meta-data and payload data) via a pointer to a buffer location or the like from SMDISK 140. In turn, SMPACER 130 sends the pointers to protocol level (layer) 120. As described below, protocol level 120 formats the packets according to the desired streaming protocol. The formatted streaming packets are then received by SMPACER 130. Based upon delivery times for each packet, SMPACER 130 then sends a stream of packets to the client system at the desired rate. In particular, protocol level 120 "filters" or adjusts the "delivery time" of packets to be output to clients, and the like. The adjusted meta-data and the payload data are then output by SMPACER 130 to a client, based upon the adjusted delivery time.

In this embodiment, protocol level 120 includes support for at least one, but typically for more than one streaming media protocols. The support includes encoding of data to form streams of streaming media and decoding of streams of streaming media. In one example, a streaming media protocol is the Microsoft Media Streaming (MMS) protocol. By supporting the MMS protocol, streams of MMS formatted data can be received from a streaming media (upstream or origin) server and the streamed (payload) data can be retrieved. This payload data can be sent to data handling layer 110 via SMDISK 140 for storage. Additionally, payload data determined by SMDISK 140 can be encoded into streams of MMS data. The encoded data are then sent to SMPACER 130 for paced delivery to a client system. The client system may play the encoded data via a player such as Microsoft Windows Media Player, and the like.

In another example, a streaming media protocol is the Real Time Streaming Protocol (RTSP). In addition to RTSP support, one embodiment includes Apple QuickTime format support and RealNetworks RealSystem format support. By supporting these protocols, streams of QuickTime formatted data or RealSystem data can be received from streaming media servers and the respective streaming (payload) data are retrieved. These payloads are then sent to data handling layer 110 via SMDISK 140 for storage. Additionally, payload data from SMDISK 140 can be encoded into streams of data and delivered to the client by SMPACER 130. The streaming data can be played on client systems via a QuickTime player or a RealSystem player, and the like. In other embodiments, other types of streaming media encoding schemes may be supported.

The above hierarchy has been described in embodiments as being implemented via software. However, it should be understood that some functions may be implemented in hardware or firmware. Accordingly, additional embodiments of the above may be implemented via hardware, firmware, software, and combinations thereof. Further description of SMPACER 130 will be given below.

FIGS. 4A-D illustrate a data format hierarchy according to an embodiment of the present invention. In particular, FIGS. 4A-D illustrate an internal storage structure/format used by embodiments for storing data that will be streamed to client systems.

An example of a streaming media cache implementing a data storage structure described below is a NetCache™ streaming media cache. NetCache™ (latest version 5.2) includes a combination of hardware and software available from the assignee of the present patent application. Embodiments of the present invention may stream data to client systems in a variety of streaming media protocols, including Microsoft Media Streaming (MMS) protocol used by Windows Media Player™; Real Time Streaming Protocol (RTSP) used by Quicktime™ from Apple Corporation and RealSystem™ from RealNetworks; and the like.

Figure 4A:
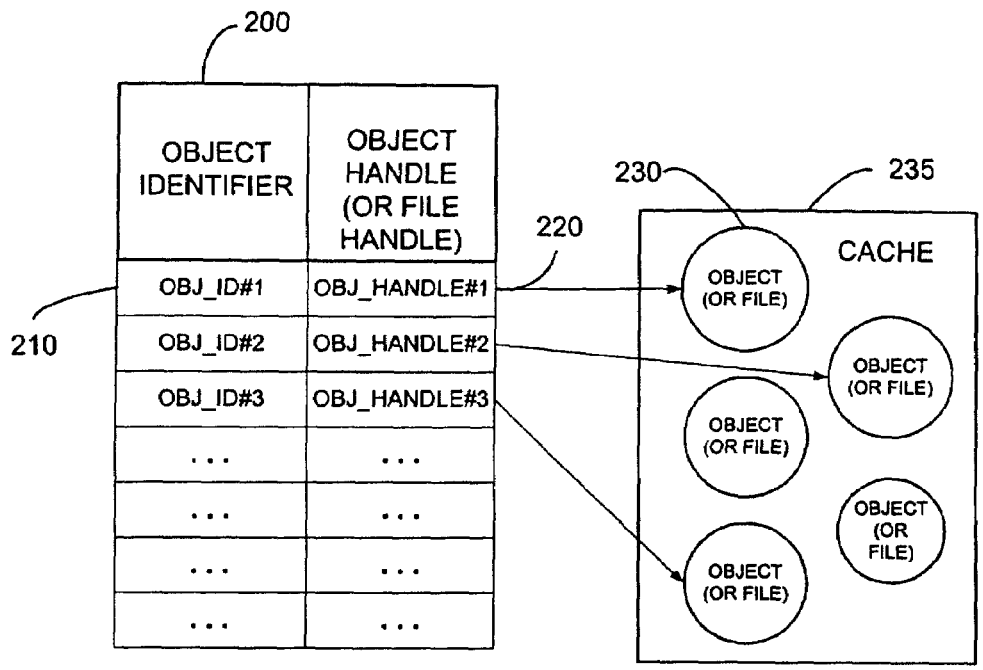
FIGS. 4A-D illustrate a data format hierarchy according to an embodiment of the present invention.

As illustrated in FIG. 4A, the present embodiment includes a cache entry table hash table 200 and a plurality of entries wherein each entry includes an object identifier 210. In one embodiment, object identifiers are file names that have been hashed. Further details regarding this aspect of the invention are disclosed in the co-pending application cited above. Cache entry table 200 typically also includes a plurality of object handles 220 for a particular object. In the present embodiment, object handles 220 may be a reference or pointer to an object 230 corresponding to the object identifier and stored in a cache 235.

In the present embodiment, object handles 220 may be used to retrieve the corresponding object 230 from cache 235. According to an embodiment of the present invention, objects 230 are stored as separate data files in cache 235. In this embodiment, each object handle 220 corresponds to a file handle and the object itself is stored as a file. Accordingly, the individual files are each independently accessible in cache 235 by a file system.

Figure 4B:
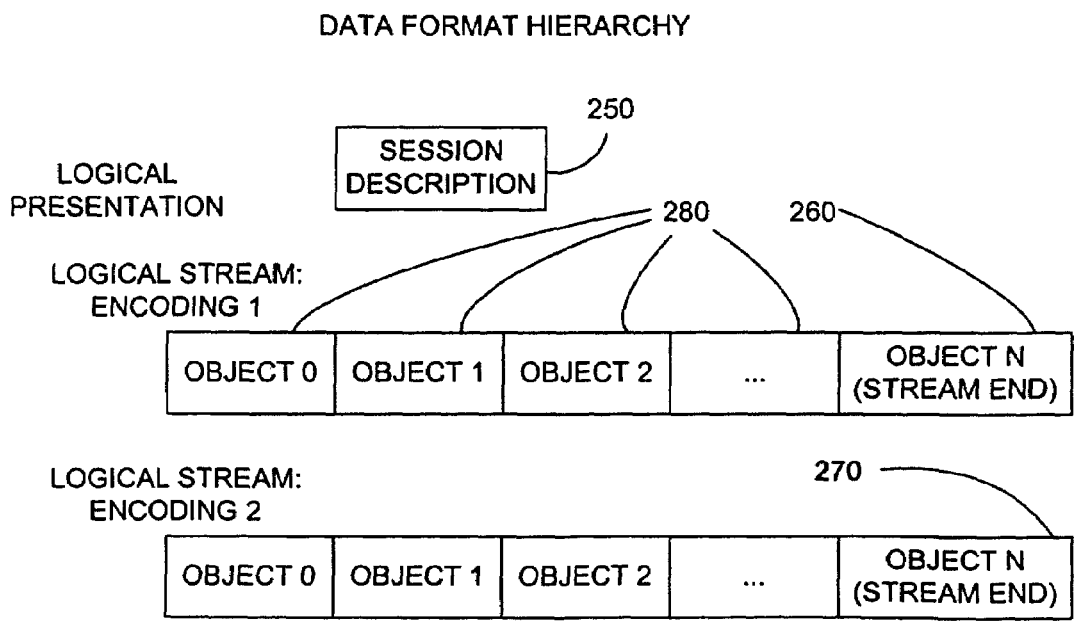

FIG. 4B illustrates a session description 250 (stored in a session data file or session data object) and logical streams of data 260 and 270 according to an embodiment. Logical stream 260 represents data for streaming media encoded in a first encoding scheme and logical stream 270 represents data for streaming media encoded in a second encoding scheme.

In the present embodiment, each of the encodings of the data are considered separate streams of data and are stored separately. This is in contrast to cases where multiple encodings of a data stream are packaged and stored within a single data file. An example of the latter is used by RealNetworks. In particular, a data file used by RealSystem may include an encoding of data destined for 56 Kbps clients, and an encoding of data destined for 384 Kbps clients. In the present embodiment, the encoding of data destined for different bit rate clients would be stored separately. For example, a 56 Kbps encoding would be stored in logical stream 260 and a 384 Kbps encoding would be stored in logical stream 270. Other typical types of parameters that may be varied for different encodings may include the bit rate, the content (e.g. abridged, unabridged), the media type (audio and/or video), thinning parameters (frame dropping), and the like.

In FIG. 4B, session description (stored in a session data object or session data file) 250 may include a description of the various streams of data stored in logical streams 260 and 270. The description may include an enumeration of the various encoding schemes (e.g. 56 Kbps, 128 Kbps, ISDN), copyright and authoring data, presentation or play-time (duration) of the stream, version data, and the like.

As an example, a sample session description for RTSP is as follows. In particular, it illustrates extrinsic properties of the media file (author, title, copyright), as well as intrinsic properties of the media file (number of media tracks, length of media file, encoding bitrate, MIME type, and codec of each media track, etc.). All of this data together serves to help uniquely identify a particular version of the URL used to access the streaming media file.

v=0
o=−983139433 983139433 IN IP4 172.30.200.154
s=G2 Video Experience
i=RealNetworks ©1998
t=0 0
a=SdpplinVersion:1610642970
a=Flags:integer;2
a=IsRealDataType:integer;1
a=StreamCount:integer;2
a=Title:buffer;
    "RzIgVmlkZW8gRXhwZXJpZW5jZQA="
a=Copyright:buffer;"qTE5OTgA"
a=Author:buffer;"UmVhbE5ldHdvcmtzAA=="
. . .
a=range:npt=0-0
m=audio 0 RTP/AVP 101
b=AS:6
a=control:streamid=0
a=range:npt=0-59.773000
a=length:npt=59.773000
a=rtpmap:101 x-pn-realaudio
a=mimetype:string;"audio/x-pn-realaudio"
a=MinimumSwitchOverlap:integer;200
a=StartTime:integer;0
a=AvgBitRate:integer;6000
a=EndOneRuleEndAll:integer;1
a=AvgPacketSize:integer;288 a=SeekGreaterOnSwitch:integer;0
a=Preroll:integer;4608
a=MaxPacketSize:integer;288
a=MaxBitRate:integer;6000
a=RMFF 1.0 Flags:buffer;"AAQAAgAAAAIAAA=="
a=StreamName:string;"audio/x-pn-multirate-realaudio logical stream"
. . .
m=video 0 RTP/AVP 101
b=AS:50
a=control:streamid=1
a=range:npt=0-57.333000
a=length:npt=57.333000
a-rtpmap:101 x-pn-realvideo
a=mimetype:string;"video/x-pn-realvideo"
a=MinimumSwitchOverlap:integer;0
a=StartTime:integer;0
a=AvgBitRate:integer;50000
a=EndOneRuleEndAll:integer;1
a=AvgPacketSize:integer;538
a=SeekGreaterOnSwitch:integer;1
a=Preroll:integer;5707
a=MaxPacketSize:integer;607
a=MaxBitRate:integer;50000
a—RMFF 1.0

Flags:buffer;"AAoAAgAAAAAgACAAAAAgAAAA-IAAA=="
. . .
a=StreamName:string;"video/x-pn-multirate-realvideo logical stream"
. . .

In the present embodiment, logical streams of data, such as logical stream 260 is made up of a series of data objects 280. As described in FIG. 4A, data objects 280 are physically separate files that are directly accessible, independent of other data objects 280, through use of cache entry hash table 200. In this embodiment, data objects 280 together store the "media payload" provided by streaming media encoded in a given encoding scheme. For example, the media payload may include the actual media data included in streaming media packets for a 56 Kbps stream, or the like. More particularly, data objects 280 store the media payload that has been converted from the format in which the origin server stores the media data into the network format for transmission to the client system and the cache. Accordingly, the data objects include data that are optimized for delivery to the client system (e.g., encapsulated in network protocol).

In the present embodiment, each data object 280 is used to store data having an associated and/or a predetermined amount of play time (duration). That is, each data object 280 is used to store media payload data that will be output as streaming data that will be played on a client system for a specific amount of time or duration. For example, in one embodiment, each data object 280 is used to store data that will be streamed to a client as 20 seconds of a music stream, video stream, or the like. In other embodiments, each data object 280 may store a media payload (data) having different duration, such as less than or equal to approximately 5 seconds, 10 seconds, 20 seconds, 30 seconds, 1 minute, or the like.

In one embodiment of the present invention, the duration of output for the media payload stored in typical data objects may be fixed for each data object among logical streams 260 and 270 (e.g. 15 seconds of a stream). However, in other embodiments, the duration of output for the media payload stored in typical data objects in logical stream 260 and data objects in logical 270 may be different. For example, for logical stream 260, the duration may be 15 seconds per data object, and for logical stream 270, the duration may be 30 seconds per data object, and the like.

In another embodiment, each data object 280 may store specific amounts of data instead of a specific duration for data. For example, each data object 280 may store a predetermined number of bytes of data, for example, less than or equal to approximately 64 Kbytes, 128 Kbytes, 512 Kbytes, 1 Mbyte, or the like. In another embodiment, each data object 280 may simply store "chapters" or logical segments of a movie or video, and the like.

In one embodiment, each data object 280 stores a fixed number of data chunks, as described below.

In one embodiment of the present invention, data objects 280 store non-overlapping data, or unique portions of the media data. That is, each of the data objects 280 may be configured to store a portion of the media data that is unique to a reference (e.g., URL) in the request to locations in the origin (or upstream) server at which the media file is stored. In another embodiment, data objects 280 may store media data that overlaps or is redundant.

Figure 4C:
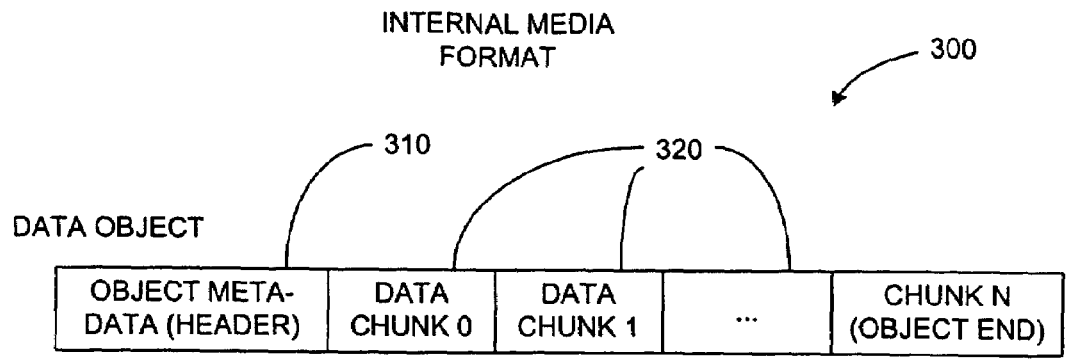

FIG. 4C illustrates a detailed description of a data object according to an embodiment of the present invention. As illustrated, FIG. 4C, a data object 300 includes object meta-data portion 310, and data chunks 320.

In this embodiment, object meta-data portion 310 is used to store data about data object 300. Such meta-data, or header data, may include file format version numbers, the number of data chunks 320 stored, the beginning presentation time and ending presentation time for data objects, and the like. In other embodiments, additional data may be stored in object meta-data portion 310 such as the data object number, protocol-specific per-data object data, a total number of bytes of payload and meta-data per data object, the number of data packets per data object, any end of stream indicators, checksum bits and the like.

In one embodiment, each data chunk 320 is also used to store data of a predetermined amount of presentation or play time (duration). That is, each data chunk 320 is used to store streaming data that will be played on a client system for a specific amount of time. For example, in one embodiment, each data chunk 320 is used to store 20 seconds of a music stream. In other embodiments, each data chunk 320 may store data having different duration, such as less than or equal to approximately 5 seconds, 10 seconds, 20 seconds, 30 seconds, 1 minute, or the like. In one embodiment of the present invention, the duration may be fixed for each data chunk 320 within data object 300. However, in other embodiments, data objects may have different durations.

In another embodiment, each data chunk 320 may store specific amounts of data. For example, each data chunk 320 may store a predetermined number of bytes of data, for example, less than or equal to approximately 32 Kbytes, 64 Kbytes, 128 Kbytes, 512 Kbytes, 1 Mbyte, or the like. In one embodiment, each data chunk has a fixed number of data packets. In still other embodiments, data chunks 320 may have a varying number of data packets.

As will be described below, in the present embodiment, each data chunk 320 is used to store the actual streaming media data. More particularly, each data chunk 320 is used to store packets of data that will be streamed to a client system.

Figure 4D:
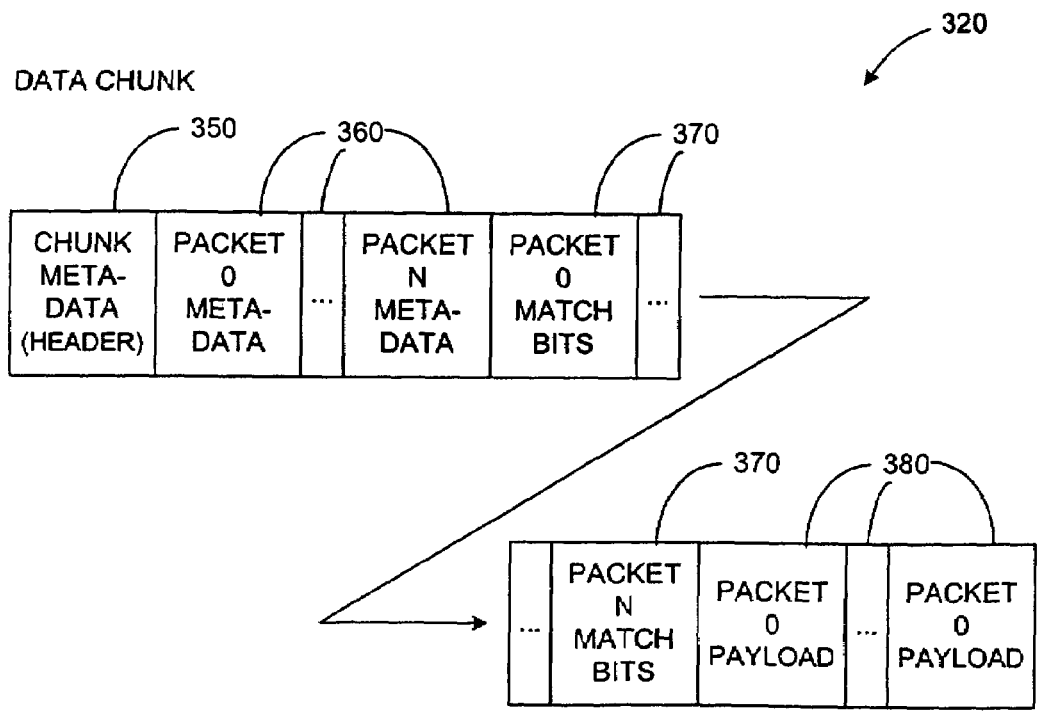

FIG. 4D illustrates a detailed description of a data chunk 320 according to an embodiment of the present invention. Each data chunk 320 includes a chunk meta-data portion 350, packet meta-data 360, packet match bits 370, and packet payloads 380.

In this embodiment, chunk meta-data portion 350 is used to store data about data chunk 320. For example, chunk meta-data portion 350 may specify the number of packet payloads (packets) 380, a file offset for a previous data chunk within the same data object, a file offset for the next data chunk within the same data object, the number of data packets in a data chunk, compressed packet meta-data for the packets, described below, and the like. In additional embodiments, the data chunk meta-data header may also include packet meta-data for all the data packets including the duration (playback duration) of the payload, the presentation time of the payload (e.g., time within a movie), the delivery time of the payload (a time SMPACER 130 delivers the payload to the client), protocol-specific data of the payload, and the like. Other types of data may be store in chunk meta-data portion 350 in other embodiments, such as timing information, and the like.

Payload packets 380 are used to store streaming data packets that make up the streaming media. For example, payload packets 380 may store audio data, image data, audiovisual data, and the like. As will be described below, the streaming data packets may be received as stream of data from a streaming media server, or may be derived from a data file received from the streaming media server. For Windows Media Player streaming media, payload packets 380 range from 200 bytes to 18 Kbytes of data, and for RealSystem streaming media and QuickTime streaming media, packet payloads 380 range from approximately 200 to 1.5 Kbytes, typically 600 bytes. The number of packet payloads in data chunk 340 typically depends upon the size of packet payloads 380.

In this embodiment, packet meta-data 360 is used to store information relevant to or associated with each payload packet 380. Types of information may include the delivery time and the presentation time, file offset of the respective payload packet 380, and the like. In the present example, the delivery time is the time SMPACER 130 should send the packet payload to the client. In contrast, the packet presentation time is the time within the media stream that the payload is displayed by the client system.

Packet match bits 370 are used in the present embodiment to store information specific to the streaming media protocol. For example, packet match bits 370 may store data such as flags to identify the start of video key-frames, such as I, B, and or P key frames, or the like. In this embodiment, packet match bits 370 are used to determine the first sendable payload (keyframe) that satisfies a seek request by the client system. In one embodiment, the match bits may be embodied as single bit, however, in other embodiments of the present invention, additional match bits may be used to represent any number of criteria, for example, for selecting which packet will be delivered first, and the like. For Windows Media Player streaming media, packet match bits 370 may be a small as a single bit, and for RealSystem streaming media and QuickTime streaming media, packet match bits 370 are approximately 32 bits.

In this embodiment, the match bits are logically grouped together and separated from the remaining packet metadata. By grouping of the match bits together, the match bits can be compressed into, for example, a single word, thereby saving memory space.

Such key frame data are useful when a client system requests to move around the stream data, for example, when jumping to a particular presentation time T within the stream.

In this embodiment, based upon packet match bits 370, the key frame immediately before presentation time T is retrieved and the play-back is begun from that key frame. It has been discovered that in one embodiment, playing-back stream data from the immediately-preceding keyframe reduces the amount of media artifacts or blank time of the stream when played on the client system.

Figure 5:
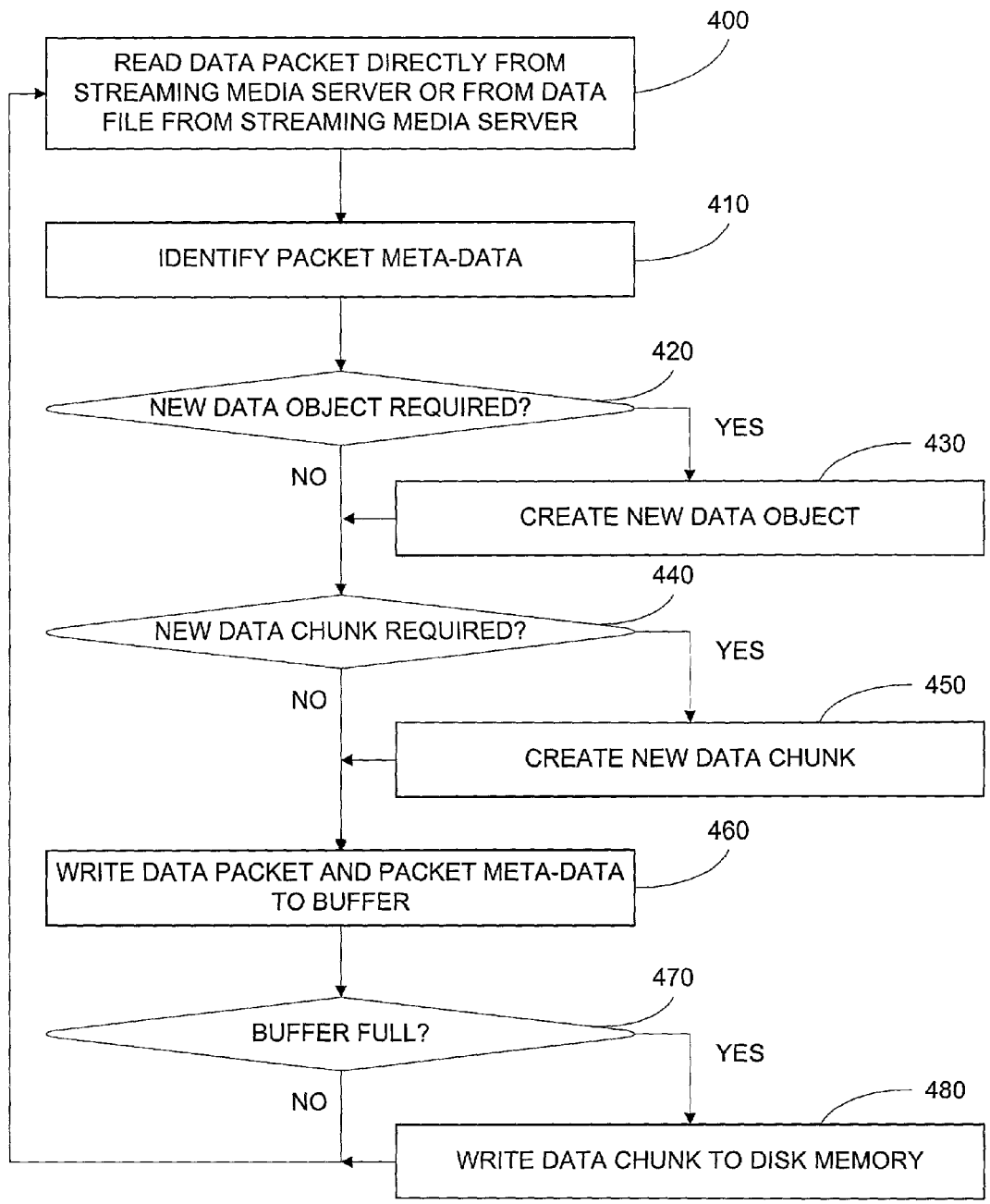
FIG. 5 illustrates a block diagram of a flow chart according to an embodiment of the present invention.

FIG. 5 illustrates a block diagram of a flow chart according to an embodiment of the present invention. More particularly, FIG. 5 illustrates a process of storing streaming media data into embodiments of the present invention. In the below embodiments, data are typically stored using the data format hierarchy illustrated in FIGS. 4A-D.

In FIG. 5, a data packet delivered from a streaming media server is received in step 400. In one embodiment, the streaming media server streams data to the streaming media cache. In such a case, a packet of data from the stream includes header data and a data packet (payload data). In another embodiment, the streaming media server sends a data file including the entire data stream to the streaming media cache. In this case, data packets and the header data are buried within the data file.

In the present embodiment, packet meta-data for a particular packet of data are then identified, step 410. In one embodiment of the present invention, the packet meta-data are derived from the header data of a particular data packet. In another embodiment, the packet is derived from the data file. The packet meta-data may include a presentation time for a data packet, an indication of a video key-frame, and the like. In this example, presentation time is the time within a media stream where the data packet is presented, for example, a data packet may have a presentation time of 20.5 seconds to 20.6 seconds representing when the data packet is output on the client system.

Next, a determination is made as to whether a new data object should be created, step 420. A new data object is typically created when a first data packet is received, or as described below a previous data object is full. In one embodiment, a new data object is created, step 430.

Next, a determination is made as to whether a new data chunk within the data object should be created, step 440. A new data chunk is typically created when a first data packet is received, or as described below, a data chunk is closed after including the previous data packet. In one case a new data chunk is created, step 450.

The data packet and the packet meta-data are then typically written to a buffer location in the streaming media cache random access memory, step 460. This buffer may be RAM 90 or buffer 97. In this embodiment, it is then determined whether the data packet is the last one for a given data chunk, step 470. If not, the process above is repeated for the next data packet.

When the data chunk is full, the chunk meta-data are determined, and the data chunk is written to random access memory (or to disk memory), step 480. In this embodiment, it is then determined whether the data chunk is the last one for a given data object, step 490. If not, the process above is repeated for the next data packet.

In this embodiment, when the data object is full, the object meta-data described above is determined, and the data object is written to disk memory, step 400. The process above may then be repeated until there are no more data packets in the media stream.

Accordingly, using the above steps, streaming media data may be received by a streaming media cache and stored in a disk memory in the object-based scheme described above. Additionally, streaming media data may be received in the form of a data file. This data file is parsed and the data are also stored in a disk memory in the object-based scheme described above.

In the above embodiment, most of the functions are performed by SMDISK 140, discussed in FIG. 3. In particular, steps 400 and 470 are typically performed at least in part by SMDISK 140; and step 480 is typically performed by a file system within operating system level 100.

Figure 6:
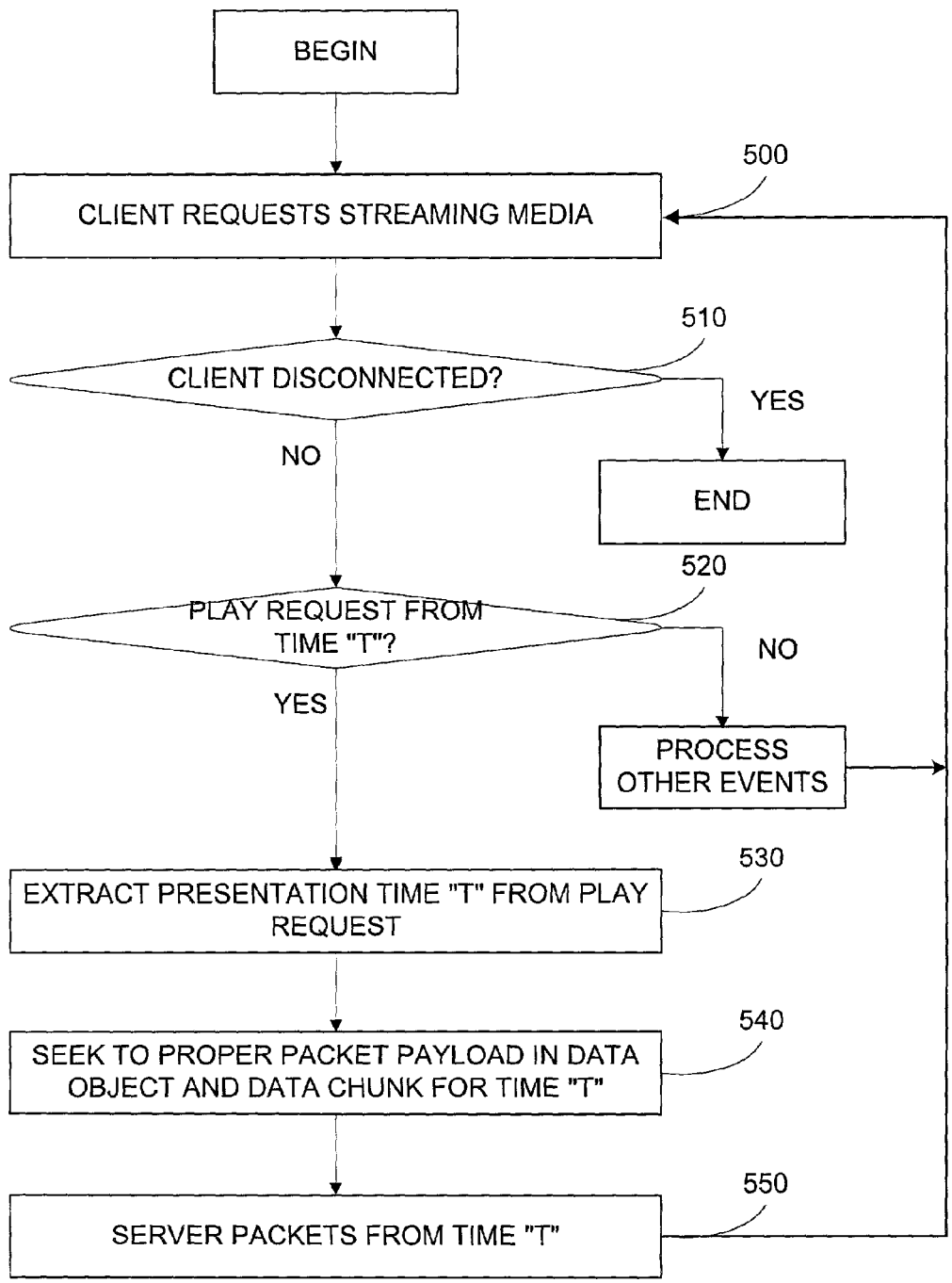
FIG. 6 illustrates a block diagram of a flowchart according to an embodiment of the present invention.

FIG. 6 illustrates a block diagram of a flowchart according to an embodiment of the present invention. In particular, FIG. 6 illustrates an overview of the process of retrieving data stored in a disk memory of the streaming media cache as described in FIGS. 4A-D and forming a stream of streaming media data to a client system.

In this example, a client system requests streaming media from an embodiment of a streaming media cache, step 500. In one case, a request for streaming media may be made directly from a client system or via a proxy. Such a request is typically in the form of a URL, or the like. Additionally, the request may specify a presentation time T that represents the time where the playback should begin. Most requests set T equal to zero, however T is typically non-zero when the client system jumps around the media stream (e.g. makes a "seek" request).

If the client system does not terminate its connection with the streaming media cache, step 510, a determination is made as to whether to playback the streaming data or not, step 520. In embodiments of the present invention, other types of client events may be specified, such as disconnecting, a play request, a pause request, a stop request, a seek request, notification to the cache that while the client is receiving streaming data from the cache, that a future object is missing and needs to be prefetched, and the like.

In the present embodiment, if streaming data are to be streamed to the client system, the presentation time T is determined, step 530. Next, based upon the time T, the payload packet that includes data having the presentation time T is located, step 540. This step is typically performed in part by SMDISK 140. Next, the data are then formatted for the specific protocol and then sent to the client system, step 550. This step is typically performed in part by SMPACER 130 and protocol level 120. More detailed descriptions of the above steps is given below.

Figure 7:
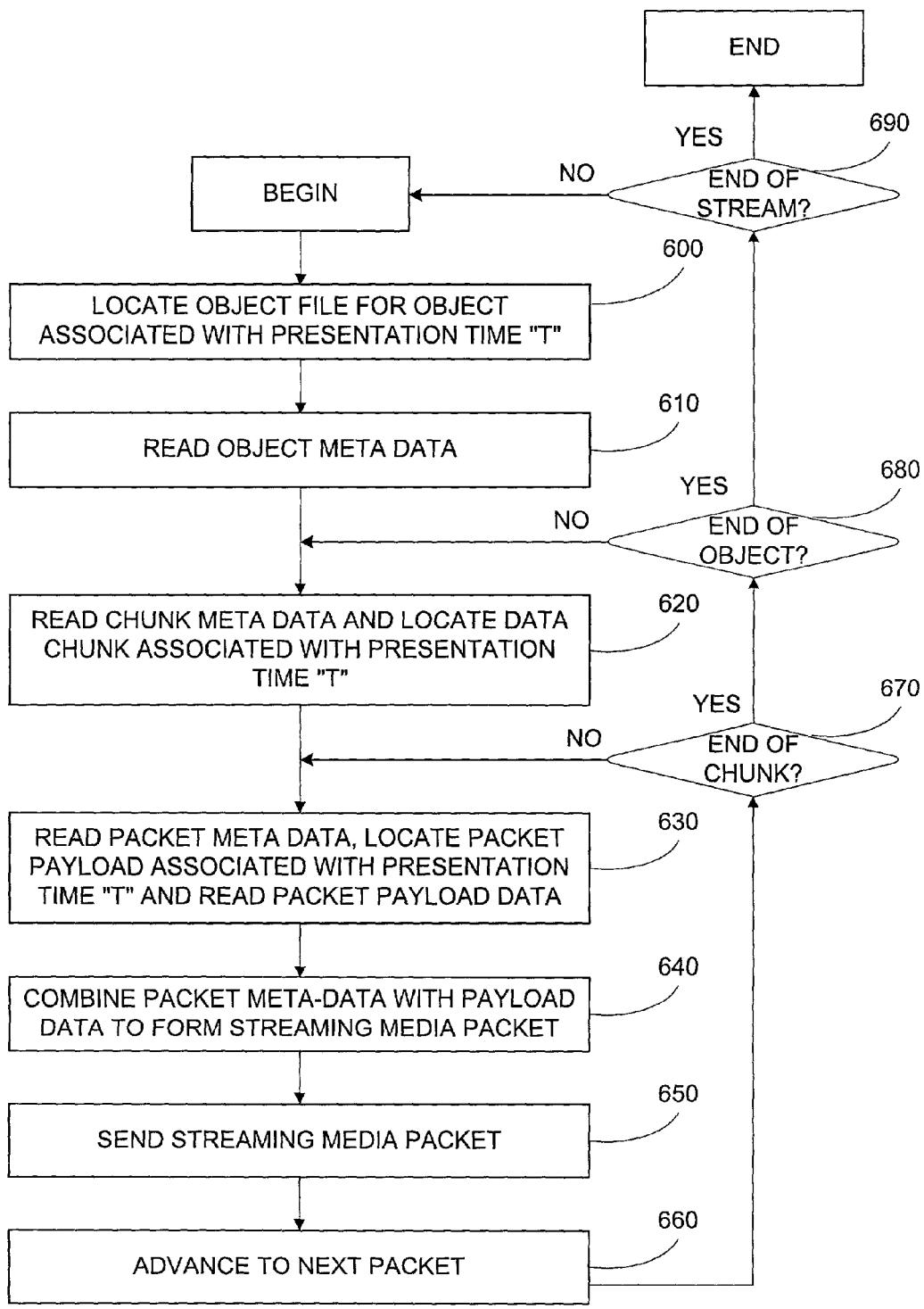
FIG. 7 illustrates a block diagram of a flowchart according to an embodiment of the present invention.

FIG. 7 illustrates a block diagram of a flowchart according to an embodiment of the present invention. In particular, FIG. 7 illustrates a more detailed process of locating and serving data.

In the present embodiment, in response to the presentation time T, the streaming media cache initially determines which data object to retrieve first, step 600. In the embodiment above, because an amount of time for each data object is fixed, for example at 10 seconds, the appropriate data object can easily be determined. For example, if the presentation time T were 5 minutes into a data stream, the appropriate data object would be the thirtieth one ((5 minutes×60 seconds/minute)/10 seconds/data object=30). In one embodiment, the URL of the file, along with the presentation time T is first hashed, and the hash is then used to access the cache entry hash table illustrated in FIG. 4A. In another embodiment, a URL of the file, the type of encoding of the file, a validator for the file, and the time T is hashed, and the hash is used to access the cache entry hash table illustrated in FIG. 4A. In return, the cache entry hash table provides the appropriate file handle of the targeted data object.

Based upon the file handle, the object meta-data are first retrieved, step 610. The data are typically stored within RAM 90. Based upon the number of chunks of data within the target data object, the target data chunk is determined. In the present embodiment, the meta-data of the first data chunk in a data object is first retrieved and stored within RAM 90. This data also includes the packet meta-data for that data chunk. Then, using the chunk meta-data, by using the file offset meta-data, the target data chunk containing the desired packet payload (keyed by presentation time) is determined.

Next, the chunk meta-data of the target data chunk is retrieved, step 620. The chunk meta-data are stored within RAM 90 for access by processor 50. As described above, the chunk meta-data may specify the number of payload packets stored within the chunk. Next, based upon the number of payload packets within the data chunk, the target payload packet is determined. The packet meta-data of the target payload packet is then retrieved and stored within RAM 90 for access by processor 50, step 630.

In the present embodiment, packet match bits 270 are also retrieved, and if compressed, uncompressed. The packet match bits 270 are typically stored within RAM 90.

In the present embodiment, portions of the packet meta-data and the target payload packet are then combined, step 640. The resulting packet is sent to the client system, step 650. In embodiments of the present invention, the target payload packet is the same as what was received from the origin server. Further, the packet meta-data are typically protocol-specific header data, i.e. the data depends upon the type of stream provided, such as Quicktime, Windows Media, and the like. for example, the meta-data may include a per-client sequence number, packet timing information, and the like.

After this target payload packet is sent, this embodiment attempts to iterate to the next payload packet, step 660. If the target payload packet is the last one of the target data chunk, step 670, this embodiment attempts to iterate to the next data chunk. If the target data chunk is the last one of the target data object, step 680, this embodiment attempts to iterate to the next data object. If the target data object is the last one of the stream, step 690, the stream terminates.

In the above embodiment steps 600-630 are performed at least in part by SMDISK 140; step 640 is performed at least in part by SMPACER 130; and step 650 is performed at least in part by SMPACER 130. More specifically, SMDISK 140 typically retrieves packet meta-data and packet payloads from the cache memory (hard disk) and stores them into a memory buffer, such as buffer 97. SMDISK 140 then gives pointers to these buffer locations to SMPACER 130, and in turn SMPACER 130 gives the pointers to these buffer locations to protocol level 120. An encoding protocol in protocol level 120 processes the meta-data portion, and importantly, then simply appends the packet payload to form an encoded packet. This encoded packet is sent to SMPACER 130 for paced delivery to a client.

As illustrated above, packet payloads are simply stored and retrieved from the cache memory (hard disk) and no processing occurs on such data. The payload data are merely segmented into convenient-sized data chunks and data objects by SMDISK 140 and then stored in the cache memory. As discussed above, these data objects are individually accessible on a file level.

FIGS. 8A-F illustrate flow diagrams according to an embodiment of the present invention. In particular, FIGS. 8A-F illustrate operation of a series of functions (execution threads) implemented by embodiments of the present invention.

Generally, embodiments of the present invention have a system architecture that includes two software architecture portions: a streaming media (encoding) protocol independent portion including protocol independent interfaces (functions), and a streaming media (encoding) protocol dependent portion including protocol dependent interfaces (functions). By having protocol dependent and independent portions, this creates a general mechanism for efficient transfer of data that is independent of the encoding format. In this embodiment, a variety of encoding formats, such as RTSP, MMS, and others are supported. These formats have different parameters, for example, packet payload size (e.g. 20 milliseconds of data per packet versus 100 milliseconds of data per packet), timing, and the like. Further, even one encoding format may have a variety of different parameters, such as bit rate, language, dropped packets, and the like. Accordingly, the inventors discovered that it would be advantageous to have a limited set of functions directed to protocol specific functions and have the remaining functions directed to storage and retrieval. Thus storage and retrieval could be generalized and optimized without consideration of the encoding protocol or format.

In this embodiment, the protocol dependent section interacts with an origin (or upstream) server and client protocol engines. More specifically, the protocol dependent section includes a series of functions that act as a streaming media client and that can negotiate and receive streaming media data from an origin (or upstream) server. Additionally, the protocol dependent section (protocol layer 120) includes a series of streaming media protocol encoders or engines.

The protocol independent section includes a series of functions that are responsible for data flow. More specifically, it includes a series of functions that direct reading and writing of streaming media files to and from the operating system level 100. This is embodied in SMDISK 140. Further, it includes functions that are responsible for sending streaming media packets to the clients according to the delivery time, and the like. These functions are typically embodied in SMPACER 130.

In this embodiment, SMPACER 130 includes two types of interfaces, explicit interfaces—a set of function calls, and implicit interfaces—messages that are passed between SMPACER 130 and Protocol Layer 120. In this embodiment, the explicit interfaces are called to have SMPACER 130 output data packets to a client at the desired delivery time. Further, the implicit interfaces are used to monitor a media stream for transmission problems, and the like. Portions of these functions are implemented as separate execution threads.

In this embodiment, three execution threads of SMPACER 130 will be described in greater detail. A "fetch" thread is responsible for initiating data reads of packet meta-data from disk memory; a "data" thread is responsible for initiating data reads of packet payload data from disk; and a "network" thread is responsible for using the packet meta-data and packet payload data to output data to the network (i.e. to the client).

In this embodiment, the fetch thread operates relatively asynchronously with respect to the network thread. As will be described below, by being asynchronous, this allows the network thread to output packet data from a first data chunk while the slower process of fetching the next chunk of data from disk memory is performed. In effect, this allows the network thread to hide latency from reading data chunks.

In the present example, the data thread is also asynchronous with respect to the network thread. As above, by being asynchronous, this allows the network thread to output data from a first data chunk while the slower process of fetching the next data chunk is performed. In effect, this allows the network thread to hide latency from reading packet payload data.

For sake of efficiency, in this embodiment, the network thread does not modify the packet payload data before it is sent to the network. In this embodiment, the network thread combines the packet meta-data, as modified by the appropriate protocol engine, with the packet payload data, and sends the combined packet to the client system.

Figure 8A:
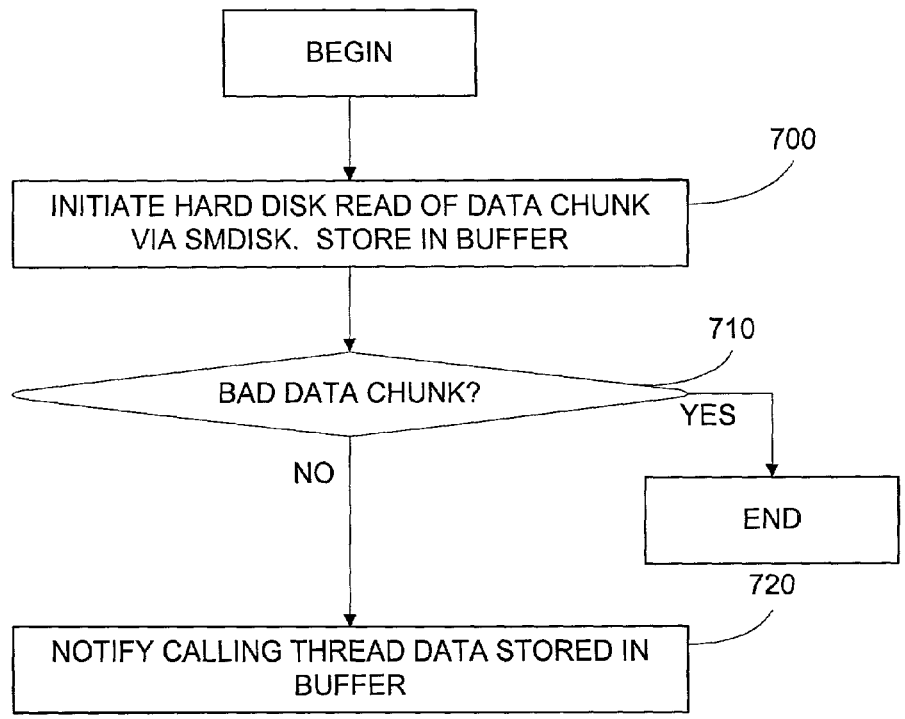
FIGS. 8A-G illustrate flow diagrams according to an embodiment of the present invention.

FIG. 8A illustrate the process flow of the data thread. In this embodiment, a process calling the data thread initially provides a reference to the data chunk desired. In response, the data thread requests the data chunk be retrieved from the disk memory, step 700. This request is typically embodied as a request to SMDISK 140 for the appropriate data chunk. In the present implementation, SMDISK 140 initiates a 64 KB data chunk read command to the operating system layer 100. When this data are returned, SMDISK 140 typically stores the chunk meta-data, packet meta-data, and packet payloads into a buffer memory, such as buffer 97.

If the data chunk returns bad data, step 710, the processing threads are aborted. If the data chunk is successfully retrieved, the process calling the data thread is notified that the data has been put into the buffer, step 720.

Figure 8B:
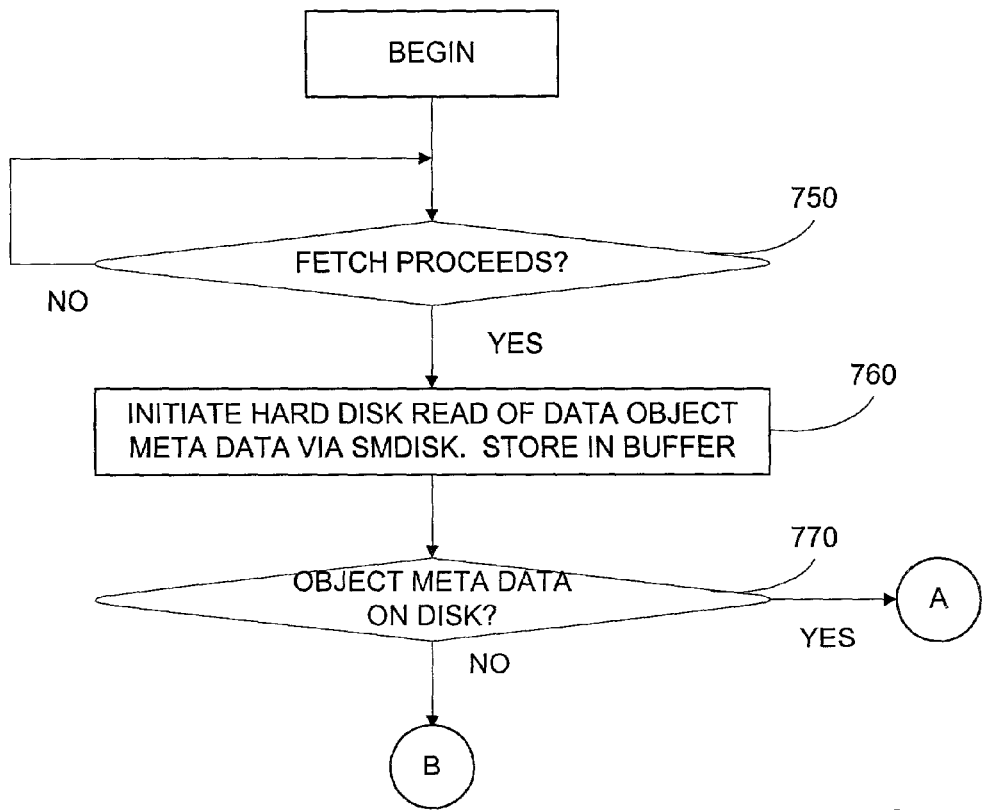
Figure 8C:
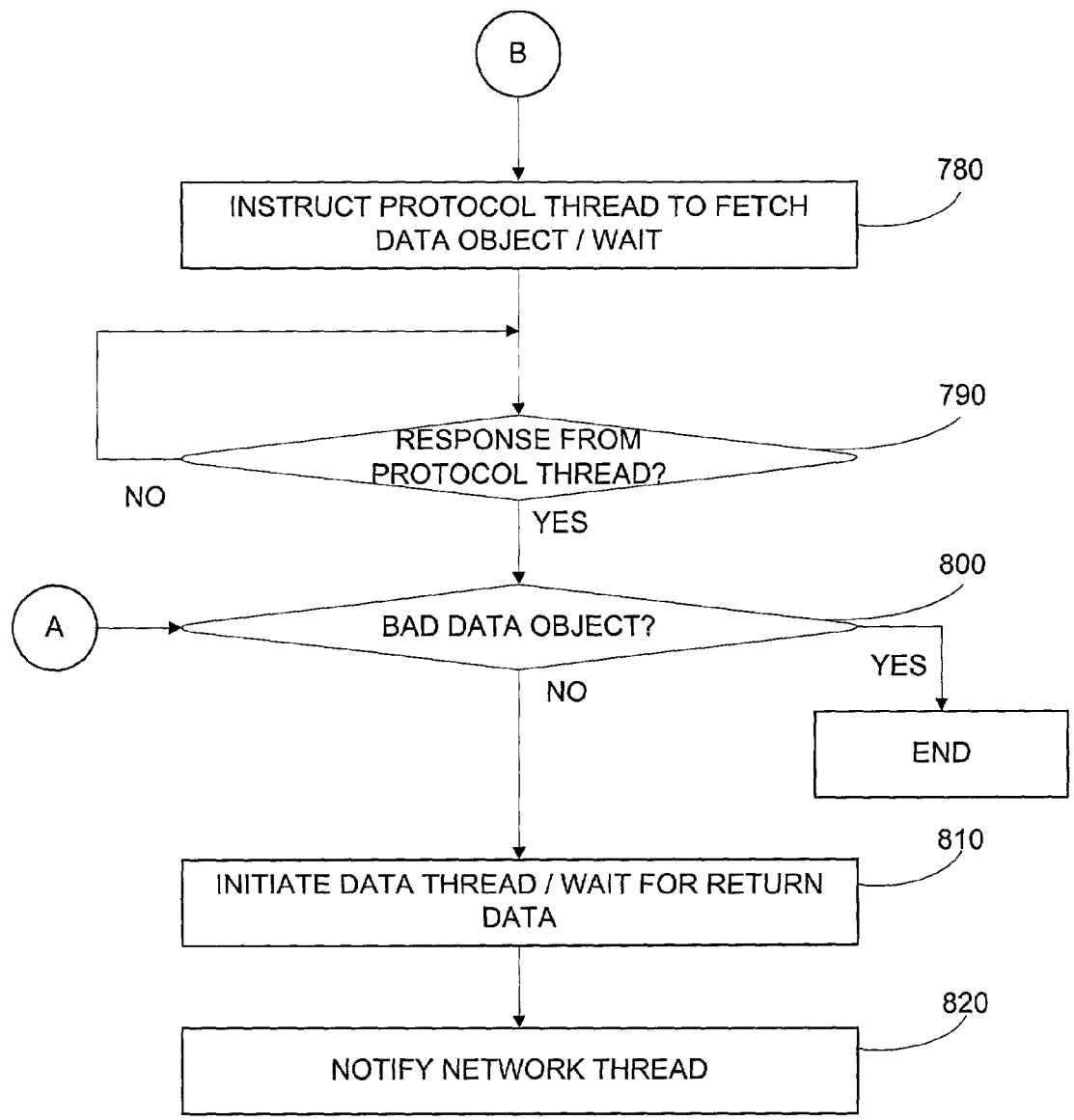

FIGS. 8B and 8C illustrate a process flow of the fetch thread. In this embodiment, the fetch thread first waits for a signal from the network thread, step 750. When signaled, the fetch thread requests the object meta-data for a data object from the disk memory, step 760. This request is typically embodied as a request to SMDISK 140 for the appropriate data object meta-data. In the present implementation, SMDISK 140 initiates a read command to the operating system layer 100. If object meta-data are returned, SMDISK 140 stores the object meta-data into a buffer memory, such as buffer 97. This process then waits until the desired object meta-data are or is not located.

In this embodiment, if the object meta-data are not located in the disk memory, step 770, the fetch thread requests protocol code in protocol layer 120, to request the data object (via start time) from the origin (or upstream) server (or to await the data), step 780. In response, it is contemplated that the protocol code (functions) in protocol layer 120 will determine the appropriate origin (or upstream) server for the data object, and negotiate to obtain the appropriate data. The data from the origin (or upstream) server may be embodied as a series of streaming media data packets beginning at the start time and ending at the end of the missing data object(s). These streaming media data packets are then stored via SMDISK 140 in the disk memory as a data object, in the format described in FIGS. 4A-4D.

In the present embodiment, the fetch thread will wait until the protocol code returns a response and the data are stored on the disk memory, step 790. In another embodiment, the process returns to step 770.

If the data chunk returns bad data, step 800, the processing threads are aborted. Otherwise, the data thread is called and fetch thread waits until the data are returned, step 810. As described above, the data thread will retrieve the next data chunk from the disk memory and notify the calling thread that the data has been stored in a buffer.

In this embodiment, when the packet payloads are retrieved, the fetch thread notifies the network thread, step 820. In the present embodiment, this signals the Network Thread that valid data are stored in the buffer.

In one embodiment of the present invention, the fetch thread does not wait in step 790 for the data to be stored in the disk memory. In such an embodiment, as data are received from the upstream server, it is buffered as discussed in step 470. In this embodiment, the network thread directly retrieves packet payloads from the same buffer, before it is written into the disk memory.

Figure 8D:
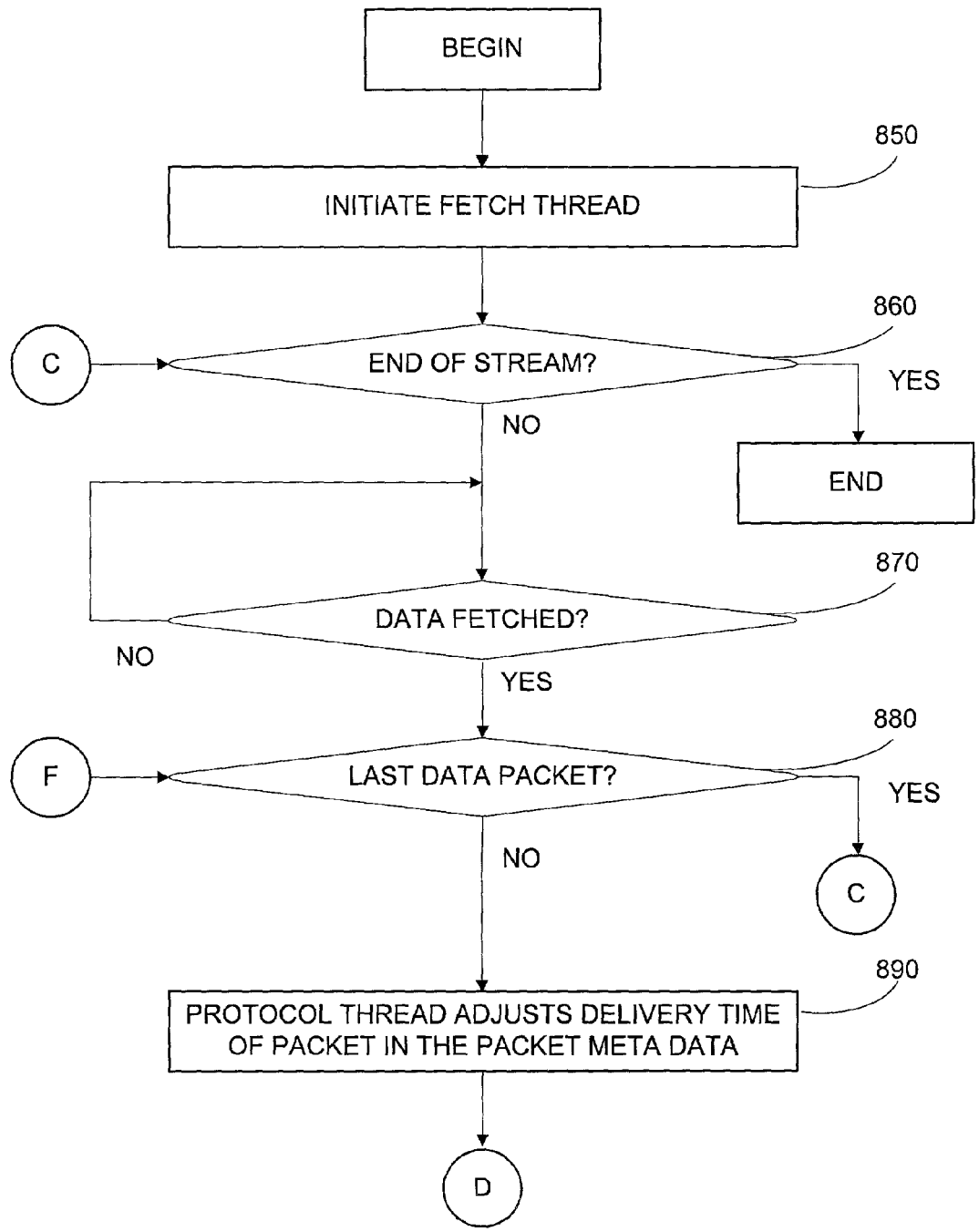
Figure 8E:
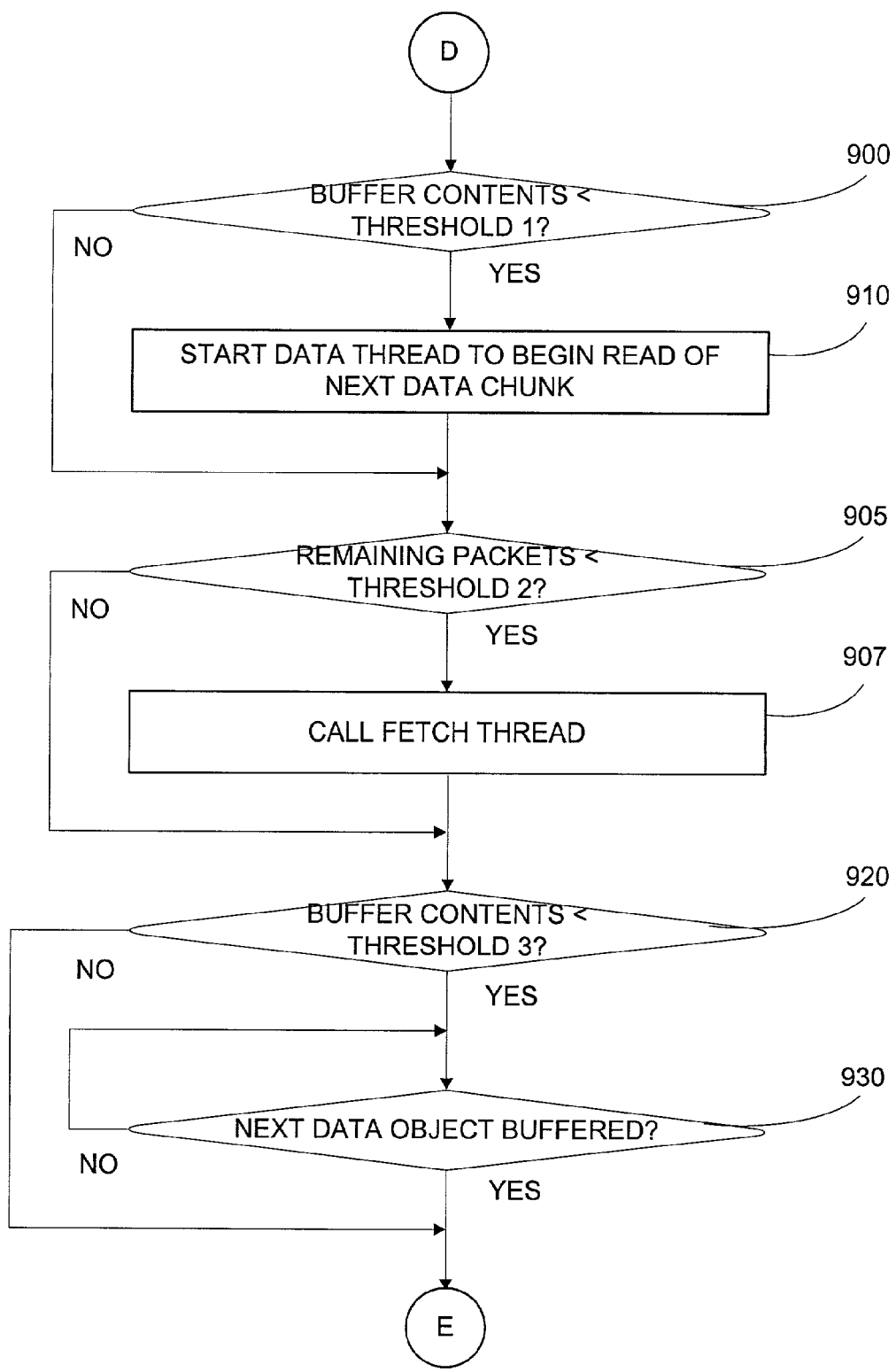
Figure 8F:
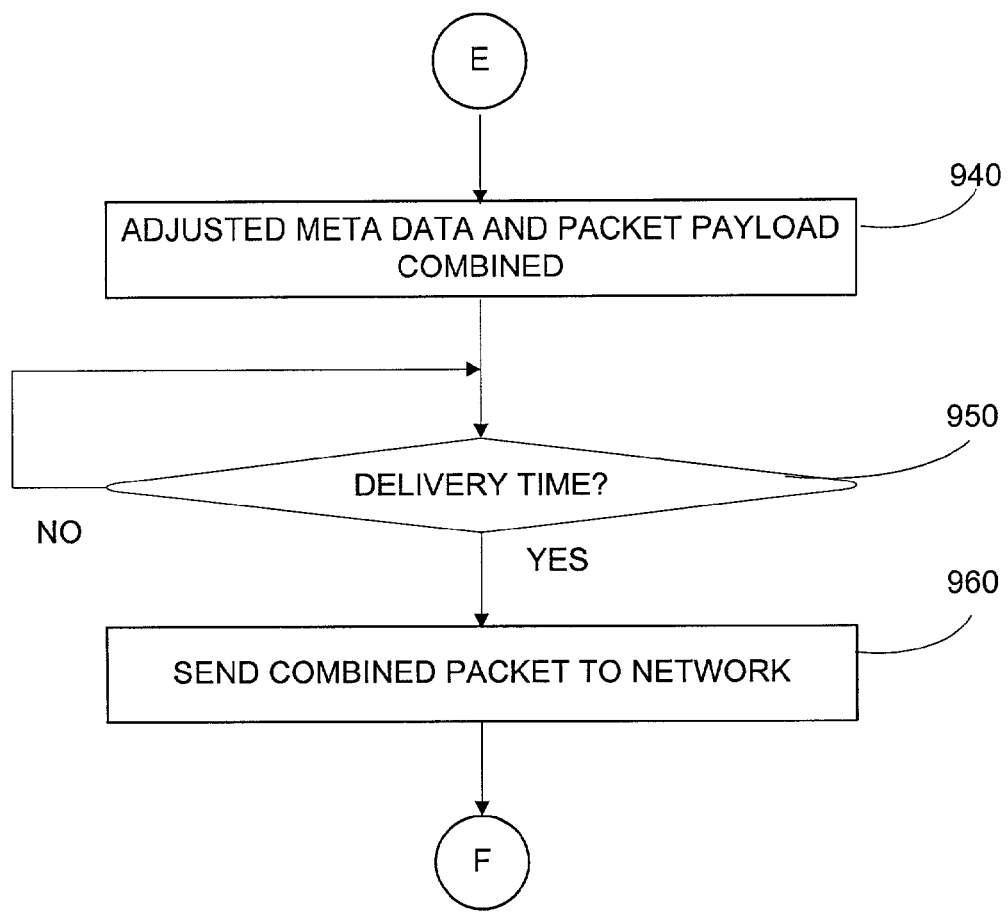

FIGS. 8D-F illustrate a process flow of the network thread. In this embodiment, the fetch thread is first invoked by a pacer thread, step 850. This step is used to "pre-fill" the buffer with object meta-data and the "first" data chunk.

Next, while, the stream of data has not ended, step 860, the network thread waits until the initial pre-fill of the buffer of a first data chunk data are completed, step 870. In the present embodiment, a determination is made if the "current" data packet is the last data packet in the data chunk, step 880. If not, protocol-specific code (filters) is called and provided with a pointer to the buffer location of the current data packet, packet meta-data, step 890. In this embodiment, the protocol specific code re-adjusts the delivery time (transport or transmission time) of the packet, the internal time stamps, packet filtering (thinning), and the like.

Next, a determination is made as to whether the remaining data in the data buffer storing the packet meta-data and the packet payloads, is less than a first threshold, step 900. In this embodiment, if so, the data thread is called, step 910. In this embodiment, the data thread is directed to retrieve packet payloads of the "next", or a "second" data chunk from the disk memory. As described above, because the disk memory access is typically a slow process, the network thread does not wait for the data thread to complete, before continuing. Accordingly, the threshold set in step 900 is set to be one where data may be available from the data buffer while the disk memory access is occurring. A typical value may be where there is less than two or more packet payloads left in the data buffer.

In this embodiment, a determination is also made as to whether the remaining number of packets the data buffer is less than a second threshold, step 905. In this embodiment, if so, the fetch thread is called, step 907. In this embodiment, the fetch thread is directed to retrieve the object meta-data of the "next", or a "second" data object from the disk memory. As described above, because the disk memory access or the access of data from an upstream server, such as an origin server, are typically slow processes, the network thread tries to avoid waiting for the fetch thread to complete, before continuing. Accordingly, the threshold set in step 905 is set to be one where data should or will still be available from the data buffer while the disk memory access is occurring. A typical value may be 10, 20, 30, or the like.

In the present embodiment, a determination is then made if the remaining data in the data buffer is less than a third threshold (e.g. empty or close to it), step 920. If so, the network thread will wait until the data thread completes the disk memory access started in step 910 above, for the next data chunk, step 930. That is the network thread will wait until the data thread indicates that data has been written into the buffer. A typical value may be where there is less than one or more packet payloads left in the data buffer.

In the remaining steps, the network thread combines packet meta-data of a first packet, adjusted by the protocol code, and the packet payload of the first packet to form a streaming media packet, step 940. The network thread then waits until the correct delivery or transmission time for the streaming media packet, step 950, and then sends the streaming media packet, to the network (and to the client), step 960.

The above process is repeated until all of the packet payloads of the first data chunk have been sent to the network. The process then repeats for the packet payloads of the second data chunk, and so on. When the last packet payload of the last data chunk of the data object has been sent to the network, the process then waits for the next data object to be fetched from memory. This fetch thread was initiated in step 907 above.

Figure 8G:
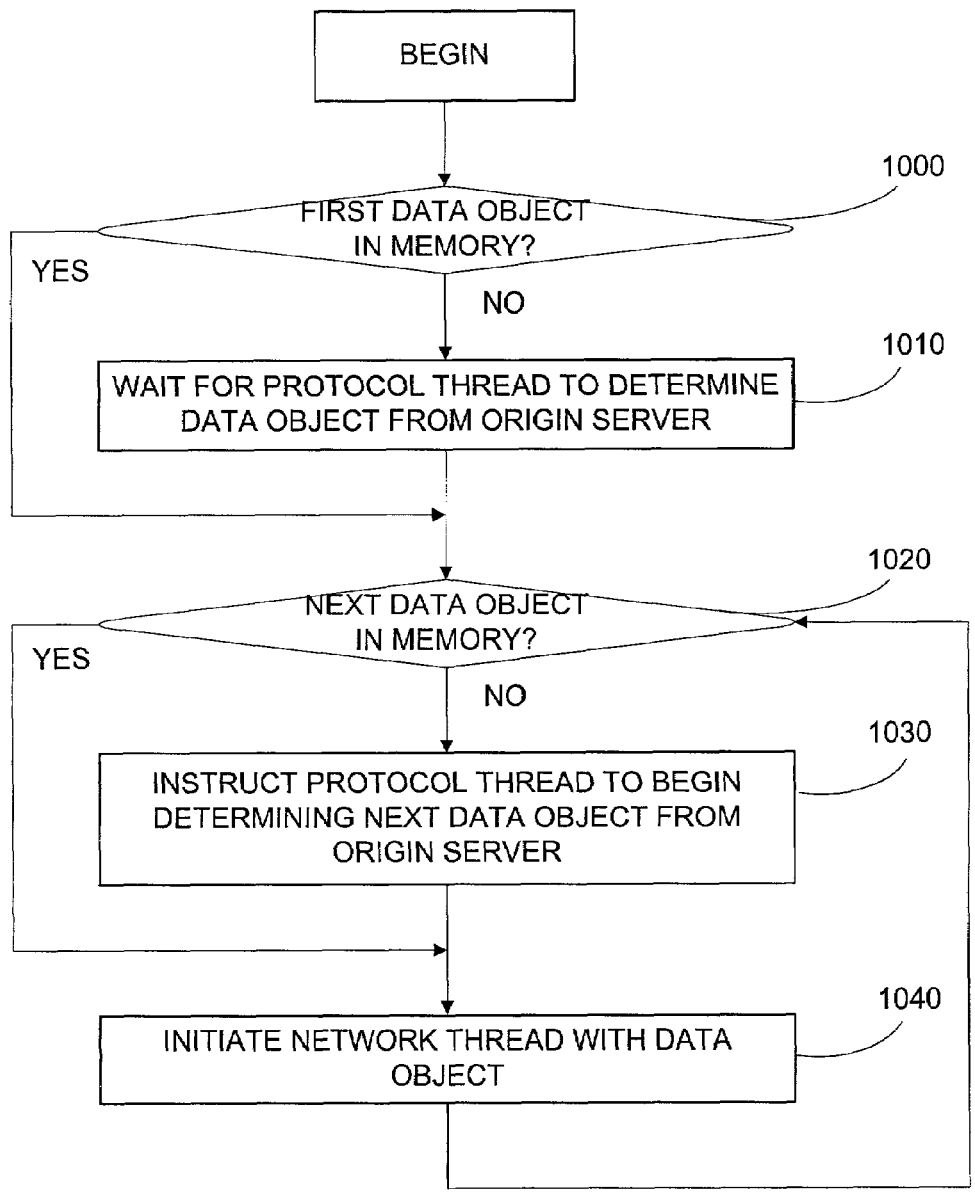

FIG. 8G illustrate a more general process flow of a portion of a pacer thread. In this embodiment, the pacer thread first determines whether a first requested data object is in the disk memory, step 1000. In one embodiment, this step may be performed by determining if there is an object handle (file) associated with the desired data object.

If the data object in not in the hard disk, a request is made to the protocol code for the data object, step 1010. As mentioned above, this step may specify the presentation time of the first data packet and the presentation time of the last data packet in the missing data object. In response, the protocol code is initiated which then negotiates with the origin (or upstream) server to obtain streaming media packets for the desired amount of time. The protocol code then stores the payload data and meta-data in the disk memory as described in FIGS. 4A-D. The protocol code may operate asynchronously with the pacer thread.

In the next step, the pacer thread determines whether a second (or next) requested data object is in the disk memory, step 1020. As described above, this may be performed by simply determining if there is an object handle (file) associated with the desired data object. If the next data object in not in the hard disk, the protocol code initiates a request for the data object to the origin (or upstream) server, step 1030. Similar to above, when the next data object is determined, it is stored to disk memory asynchronously.

In the present embodiment, the pacer thread then makes a network thread call to begin the data transfer to the network (client), step 1040. The process above is then repeated, asynchronously. With the above architecture, the network thread (outputting of data) and the fetch thread and the protocol code (input of data) are more decoupled.

Advantages to embodiments of the present invention are believed to include that the network thread can output data packets at a smoother rate than data are fetched (from the fetch thread or the protocol code). As summarized above in FIG. 8G, the output of data packets from one data object occurs while data are being fetched from a next data object. As discussed, the fetching of a next data object is from a disk (fetch thread) or from an upstream server (protocol code). Fetching data from such sources is typically a time consuming process. Accordingly, embodiments of the present invention begin the fetch data process before the data are needed for output.

In view of the above disclosure, many other variations can be envisioned. For example, the protocol code may request that entire streams of data be streamed across the network, or that a file including the data be transferred across the network. As another example, the amount of data that is pre-fetched may vary. For example, in one embodiment, only the next data object is fetched, whereas in other embodiments, the next two, three, four or more data objects can be pre-fetched. As a further enhancement, the number of data objects pre-fetched may vary according to cache or network load. For example, when the streaming media cache is serving a few data streams, a greater number of data objects may be pre-fetched than when the streaming media cache is serving a larger number of data streams.

The invention has been described in embodiments above as a file cache or a streaming media cache. It should be understood, however, that, embodiments may be embodied in any computer system as a stand-alone system, or as part of another system. For example, one embodiment may be integrated into a computer system that includes web server software, database software, and the like. As another example, one embodiment may be distributed among a set of computer systems in a network, or the like. In similar examples, when there is a miss, embodiments of the present invention may access other embodiments in the network (upstream servers) before attempting to access an origin server, or the like.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A network caching system to cache streaming media, comprising:
    a processor;
    a non-volatile mass storage facility coupled to the processor, to cache streaming media data; and
    a memory storing program code, for execution by the processor, the code implementing:
        an operating system;
        a protocol dependent caching subsystem, which includes a plurality of streaming media encoders to support a plurality of streaming media protocols, wherein the protocol dependent caching subsystem is configured to interact with an upstream server, including to obtain from the upstream server streaming media data encoded according to a particular streaming media protocol, to decode the streaming media data for storage in the mass storage facility, and subsequently to encode the streaming media data into a first streaming media protocol used by a client system after the streaming media data is retrieved from the mass storage facility for delivery to the client system; and
        a protocol independent caching subsystem, distinct from the protocol dependent caching subsystem, configured to manage flow of streaming media data to and from the operating system in a streaming media protocol independent manner, including to store the streaming media data obtained from the upstream server in the mass storage facility after the streaming media data has been decoded by the protocol dependent caching subsystem, in a form that is encapsulated in a network protocol to be optimized for delivery to the client system, and to store streaming protocol specific metadata with the streaming media data in the mass storage facility, and subsequently to retrieve the streaming media data from the mass storage facility for subsequent encoding by the protocol dependent caching subsystem and delivery to the client system, wherein the protocol independent caching subsystem further is configured to deliver the streaming media data to the client system according to the first streaming media protocol and to control a pace of delivery of the streaming media data to the client.

2. A network caching system as recited in claim 1, wherein the protocol independent caching subsystem comprises:
    a disk subsystem to control storage of streaming media data in the mass storage facility and retrieval of streaming media data from the mass storage facility; and
    a pacer subsystem to control delivery of streaming media data to the client system.

3. A network caching system as recited in claim 2, wherein the streaming media data are read from the mass storage facility asynchronously with respect to outputting the streaming media data to the client system.

4. A network caching system as recited in claim 2, wherein the streaming media data are read from the mass storage facility at a pace independent of a requested pace for streaming the streaming media data.

5. A network caching system as recited in claim 2, wherein the streaming media data are read from the mass storage facility as one or more data objects that include payload packets comprising media data formatted in accordance with a streaming media format supported by the client system.

6. A network caching system as recited in claim 1, wherein the streaming media data is stored in the mass storage facility as a plurality of discrete data objects, each of said data objects containing a separate portion of a media stream in the form of a plurality of media packets with metadata specific to a particular streaming media protocol.

7. A network caching system as recited in claim 6, wherein each of said plurality of discrete data objects is a file.

8. A network caching system to cache streaming media, comprising:
   a processor;
   a non-volatile mass storage facility coupled to the processor, to cache streaming media data; and
   a memory storing program code, for execution by the processor, the code implementing:
      an operating system;
      a protocol dependent caching subsystem, which includes a plurality of streaming media encoders to support a plurality of streaming media protocols, wherein the protocol dependent caching subsystem is configured to interact with an upstream server, including to obtain from the upstream server streaming media data encoded according to a particular streaming media protocol, to decode the streaming media data for storage in the mass storage facility, and subsequently to encode the streaming media data into a first streaming media protocol used by a client system after the streaming media data is retrieved from the mass storage facility for delivery to the client system; and
      a protocol independent caching subsystem, distinct from the protocol dependent caching subsystem, configured to manage flow of streaming media data to and from the operating system in a streaming media protocol independent manner, including to store the streaming media data obtained from the upstream server in the mass storage facility after the streaming media data has been decoded by the protocol dependent caching subsystem, in a form that is encapsulated in a network protocol to be optimized for delivery to the client system, and to store streaming protocol specific metadata with the streaming media data in the mass storage facility, wherein the streaming media data are stored in the mass storage facility as a plurality of discrete data objects, each of said data objects containing a separate portion of a media stream in the form of a plurality of media packets formatted for a particular streaming media protocol, the protocol independent caching subsystem further configured to subsequently retrieve the streaming media data from the mass storage facility for subsequent encoding by the protocol dependent caching subsystem and delivery to the client system, wherein the protocol independent caching subsystem further is configured to deliver the streaming media data to the client system according to the first streaming media protocol and to control a pace of delivery of the streaming media data to the client, wherein the streaming media data are read from the mass storage facility at a pace independent of a requested pace for streaming the streaming media data.

9. A network caching system as recited in claim 8, wherein the protocol independent caching subsystem comprises:
   a disk subsystem to control storage of streaming media data in the mass storage facility and retrieval of streaming media data from the mass storage facility; and
   a pacer subsystem to control delivery of streaming media data to the client system.

10. A network caching system as recited in claim 9, wherein the streaming media data are read from the mass storage facility asynchronously with respect to outputting the streaming media data to the client system.

11. A network caching system as recited in claim 9, wherein the streaming media data are read from the mass storage facility as one or more data objects that include payload packets comprising media data formatted in accordance with a streaming media format supported by the client system.

12. A method of operating a streaming media cache on a network, comprising:
   using a protocol dependent caching subsystem in the cache, which includes a plurality of streaming media encoders to support a plurality of streaming media protocols, to obtain from an upstream server streaming media data encoded according to a particular streaming media protocol;
   using the protocol dependent caching subsystem to decode the streaming media data for storage in a mass storage facility of the cache;
   using a protocol independent caching subsystem in the cache, distinct from the protocol dependent caching subsystem, to store the decoded streaming media data in the mass storage facility after the streaming media data has been decoded by the protocol dependent caching subsystem, in a form that is encapsulated in a network protocol to be optimized for delivery to the client system, and to store streaming protocol specific metadata with the streaming media data in the mass storage facility;
   in response to a request for the streaming media data from a client system, using the protocol independent caching subsystem to retrieve the streaming media data from the mass storage facility for subsequent encoding by the protocol dependent caching subsystem; and
   using the protocol dependent caching subsystem to encode the streaming media data retrieved from the mass storage facility into a first streaming media protocol used by the client system; and
   using the protocol independent caching subsystem to deliver the encoded streaming media data to the client system according to the first streaming media protocol and to control a pace of delivery of the streaming media data to the client.

13. A method as recited in claim 12, wherein the protocol independent caching subsystem comprises:
   a disk subsystem to control storage of streaming media data in the mass storage facility and retrieval of streaming media data from the mass storage facility; and
   a pacer subsystem to control delivery of streaming media data to the client system.

14. A method as recited in claim 12, wherein the streaming media data are read from the mass storage facility asynchronously with respect to outputting the streaming media data to the client system.

15. A method as recited in claim 12, wherein the streaming media data are read from the mass storage facility at a pace independent of a requested pace for streaming the streaming media data.

16. A method as recited in claim 12, further comprising reading from the mass storage facility one or more data objects that include payload packets comprising media data formatted in accordance with the streaming media format supported by the client system.

17. A method as recited in claim 12, wherein the streaming media data is stored in the mass storage facility as a plurality of discrete data objects, each of said data objects containing a separate portion of a media stream in the form of a plurality of media packets with metadata specific to a particular streaming media protocol.

18. A method as recited in claim 17, wherein each of said plurality of discrete data objects is a file.

* * * * *